United States Patent
Roy et al.

(10) Patent No.: US 11,410,420 B1
(45) Date of Patent: Aug. 9, 2022

(54) ENHANCING BRANCH OPENING AND CLOSING PROCEDURES USING AUTONOMOUS DRONE SECURITY AND MONITORING

(71) Applicant: Wells Fargo Bank, N.A., San Francisco, CA (US)

(72) Inventors: Debarchana Roy, San Francisco, CA (US); Dustin Boyle, San Francisco, CA (US); Andriy Fedorchuk, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 190 days.

(21) Appl. No.: 16/941,114

(22) Filed: Jul. 28, 2020

(51) Int. Cl.
```
G06V 20/20      (2022.01)
G05D 1/00       (2006.01)
B64C 39/02      (2006.01)
H04W 4/80       (2018.01)
G06V 20/13      (2022.01)
```
(Continued)

(52) U.S. Cl.
CPC ............ *G06V 20/20* (2022.01); *B64C 39/024* (2013.01); *G05D 1/0022* (2013.01); *G06V 20/13* (2022.01); *G06V 20/52* (2022.01); *G06V 20/64* (2022.01); *H04W 4/80* (2018.02); *B64C 2201/127* (2013.01); *B64C 2201/141* (2013.01)

(58) Field of Classification Search
CPC ........ G06V 20/20; G06V 20/52; G06V 20/64; G06V 20/13; B64C 39/024; G05D 1/0022; H04W 4/80
See application file for complete search history.

(56) References Cited

U.S. PATENT DOCUMENTS

| | | | |
|---|---|---|---|
| 8,573,529 B2 | 11/2013 | Mohamadi | |
| 9,329,001 B2 | 5/2016 | Mohamadi | |
| 9,633,547 B2 | 4/2017 | Farrand et al. | |

(Continued)

OTHER PUBLICATIONS

Kimberley Mok; Deep Learning Drone Detects Fights, Bombs, Shootings in Crowds; https://thenewstack.io/deep-learning-drone-detects-fights-bombs-shootings-in-crowds/; Dated Jul. 26, 2018; pp. 1-12.

(Continued)

*Primary Examiner* — David Bilodeau
(74) *Attorney, Agent, or Firm* — Foley & Lardner LLP

(57) ABSTRACT

Systems, methods, and apparatuses for performing an opening or closing security procedure at a provider location using an unmanned aerial vehicle (UAV) are described herein. An autonomous security system includes a UAV, a user device, and a UAV security system. The UAV security system includes a processing circuit structured to guide the UAV along a predetermined route within or near the provider location. The processing circuit is further structured to receive monitoring data associated with the provider location and its surroundings from the UAV, the monitoring data comprising ultra-wideband (UWB) data and radio-frequency identification (RFID) data. The processing circuit is further configured to identify a foreign object based on the monitoring data, determine that the foreign object is one of a security threat or a defect, and provide a notification to the user device regarding the one of the security threat or the defect.

20 Claims, 8 Drawing Sheets

(51) Int. Cl.
  *G06V 20/52* (2022.01)
  *G06V 20/64* (2022.01)

(56) References Cited

U.S. PATENT DOCUMENTS

| | | | |
|---|---|---|---|
| 10,061,318 B2 * | 8/2018 | Myslinski | B64D 47/08 |
| 10,088,841 B2 | 10/2018 | Kerzner | |
| 10,173,773 B1 | 1/2019 | Flick | |
| 10,301,018 B2 * | 5/2019 | Mucci | B64C 39/024 |
| 11,284,040 B2 * | 3/2022 | Yearwood | B60P 3/32 |
| 2008/0144884 A1 | 6/2008 | Habibi | |
| 2017/0287295 A1 | 10/2017 | Aswath et al. | |
| 2018/0050800 A1 * | 2/2018 | Boykin | G10L 25/51 |
| 2018/0233009 A1 | 8/2018 | Spector | |
| 2019/0164019 A1 * | 5/2019 | Djiofack | B64C 39/02 |
| 2020/0178505 A1 * | 6/2020 | Womble | A01K 5/0291 |
| 2020/0202284 A1 * | 6/2020 | Singh | G06Q 20/18 |
| 2020/0354059 A1 * | 11/2020 | Newman | B64C 39/024 |
| 2022/0055770 A1 * | 2/2022 | O'Toole | H04W 12/037 |

OTHER PUBLICATIONS

Mosay Jala; The Way Drones Can Detect People Carrying Weapons;https://www.meee-services.com/the-way-drones-can-detect-people-carrying-weapons/;Dated: Jul. 2, 2018; pp. 1-6.

* cited by examiner

ENHANCING BRANCH OPENING AND CLOSING PROCEDURES USING AUTONOMOUS DRONE SECURITY AND MONITORING

TECHNICAL FIELD

The present disclosure relates to enhancing the security of various provider locations while performing opening and closing procedures. More particularly, the present disclosure relates to systems and methods for enhancing the security of provider location opening and closing procedures using autonomous drone security and monitoring.

BACKGROUND

Various providers utilize a human driven process for opening and closing procedures associated with corresponding provider locations. These procedures can include a person (e.g., a provider employee or a third party security agency employee) walking or driving the perimeter of the location to ensure there is no suspicious activity taking place prior to opening or closing the provider location. This process can endanger the provider employee or third party security agency employee and possibly lead to an attack. The current process can also be very time consuming and expensive for the business to perform.

SUMMARY

One embodiment relates to an autonomous security system associated with a provider location. The autonomous security system comprises an unmanned aerial vehicle (UAV), a user device, and a UAV security system. The UAV security system comprises a network interface and a processing circuit. The network interface is structured to facilitate data communication with the UAV and the user device via a network. The processing circuit comprises a processor and a memory. The processing circuit is structured to deploy the UAV from a UAV base. The processing circuit is further structured to guide the UAV along a predetermined route within or near the provider location. The processing circuit is further structured to receive monitoring data associated with the provider location and its surroundings from the UAV, the monitoring data comprising ultra-wideband (UWB) data and radio-frequency identification (RFID) data, the RFID data being associated with a sensed location of an RFID chip coupled with a structural component of the provider location. The processing circuit is further structured to identify a foreign object based on the monitoring data. The processing circuit is further structured to determine that the foreign object is one of a security threat or a defect. The processing circuit is further structured to provide a notification to the user device regarding the one of the security threat or the defect.

Another embodiment relates to a method for performing an opening or closing security procedure at a provider location using an unmanned aerial vehicle (UAV). The method comprises deploying, by an autonomous security system, the UAV from a UAV base. The method further comprises guiding, by the autonomous security system, the UAV along a predetermined route within or near the provider location. The method further comprises receiving, by the autonomous security system, monitoring data associated with the provider location and its surroundings from the UAV, the monitoring data comprising ultra-wideband (UWB) data and radio-frequency identification (RFID) data, the RFID data being associated with a sensed location of an RFID chip coupled with a structural component of the provider location. The method further comprises identifying, by the autonomous security system, a foreign object within the provider location and its surroundings based on the monitoring data. The method further comprises determining, by the autonomous security system, that the foreign object is one of a security threat or a defect. The method further comprises providing, by the autonomous security system, a notification to a user device regarding the one of the security threat or the defect.

Another embodiment relates to a method for assessing a potential threat at a provider location using an unmanned aerial vehicle (UAV). The method comprises detecting, by an autonomous security system, the potential threat within or near the provider location. The method further comprises deploying, by the autonomous security system, the UAV from a UAV base in response to detecting the potential threat. The method further comprises guiding, by the autonomous security system, the UAV to a location of the potential threat. The method further comprises receiving, by the autonomous security system, monitoring data associated with the provider location and the potential threat from the UAV, the monitoring data comprising ultra-wideband (UWB) data and radio-frequency identification (RFID) data, the RFID data being associated with a sensed location of an RFID chip coupled with a structural component of the provider location. The method further comprises determining, by the autonomous security system, that the potential threat is a security threat based on the monitoring data. The method further comprises providing, by the autonomous security system, a notification to a user device regarding the security threat.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Figure 1:
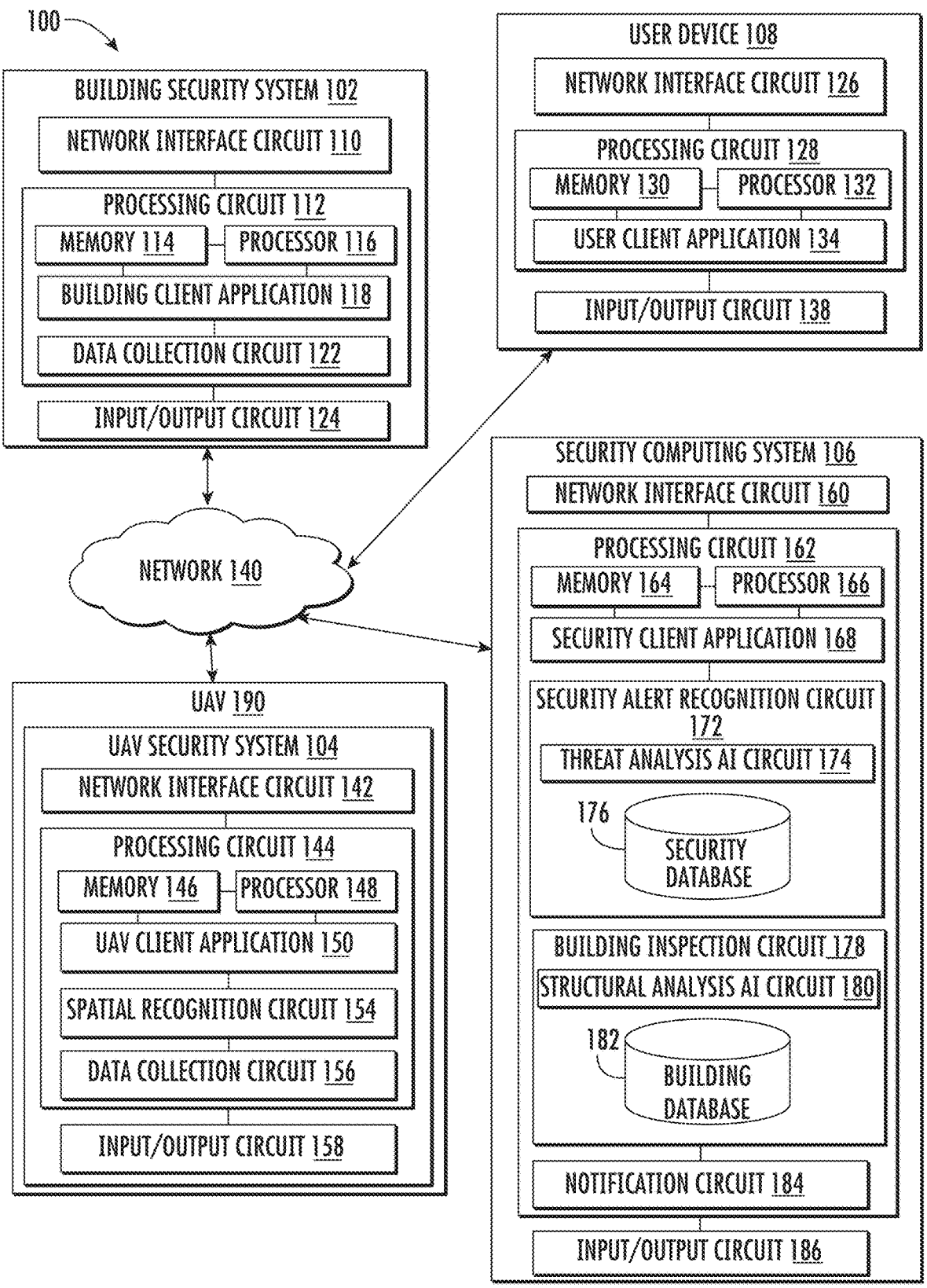
FIG. 1 is a diagram of an autonomous security system, according to an example embodiment.

Referring generally to the figures, systems and methods for securely performing opening and closing procedures at a provider location associated with a provider using autonomous drone security and monitoring are shown and described. The systems and methods described herein enhance the opening and closing procedures by utilizing an autonomous security system that allows for a full security and structural check of a building (e.g., the provider location) and its surroundings.

For example, the UAV may take off to follow its predetermined route prior to the opening of the provider location. Along the route, the UAV may identify a foreign object and determine it is a person waiting outside the provider location. The UAV may then collect data regarding the person's demeanor and scan them using the ultra-wideband sensor. The system then analyzes the data collected by the UAV to determine the person's emotional state and whether they are carrying a weapon. If the person is determined to be a threat, a prompt may be sent to a user device associated with an employee (e.g., a provider employee or a third party security agency employee) who may be prompted to decide whether to notify local authorities or continue the routine opening procedure. The prompt can be directly sent to the authorities as well in the form of a notification (e.g., a security threat notification).

The embodiments of the autonomous security system described herein improve current opening and closing procedures by performing certain steps that cannot be done by conventional security systems or human actors. For example, the autonomous security system reduces or eliminates the time traditionally required by provider employees or third party employees to perform security checks of the building at open and close. Further, the autonomous security system improves the safety for provider employees or third party employees by allowing for the provider employees or third party employees to assess potential threats from a safe location. Additionally, the autonomous security system is able to determine if a person is carrying a weapon or a package that contains a dangerous item (e.g., a bomb), thereby providing additional information for provider or third party employees assessing a potential threat that may not otherwise have been detected using traditional systems and methods. Furthermore, the autonomous security system can identify various structural defects in the building (e.g., the provider location), thereby providing increased insight to the functioning and structural soundness of the building.

As utilized herein, the terms "unmanned aerial vehicle" ("UAV") and "drone" can be used interchangeably. These terms in the context of this patent application refer generally to an aircraft with no human pilot onboard that can be controlled remotely or autonomously.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

FIG. 1 is a block diagram of an autonomous security system 100 for securely performing opening and/or closing procedures at a provider location associated with a provider, such as a credit card issuer, a bank, a retailer, a service provider, or the like. The system 100 further allows for the detection and generation of various alerts pertaining to detected threats in or around the provider location at any time (e.g., during opening and/or closing procedures, throughout a business day, and/or after hours). The system 100 additionally allows for the inspection of the building (e.g., the provider location) to ensure structural integrity.

The system 100 includes a building security system 102, an unmanned aerial vehicle (UAV) security system 104, a security computing system 106, and a user device 108. The building security system 102, UAV security system 104, security computing system 106, and user device 108 are in communication with each other and connected by a network 140. The user device 108 may be any suitable user computing device. For example, the user device 108 may be a mobile phone, a personal computer (e.g., a desktop computer or a laptop computer), a tablet, a wearable device (e.g., a smart watch), an augmented reality interface (e.g., smart glasses), or any other suitable user computing device capable of accessing and communicating using local and/or global networks. In some embodiments, the augmented reality interface is a modified reality headset configured to generate an overlay of augmented reality data collected by the UAV security system 104 or the building security system 102 to be overlaid over a video or image of the user's surroundings. In these embodiments, the user device 108 may be a virtual reality headset that displays a virtual reality view of the foreign object, provider location, and/or the surroundings to a user who may be in the building, outside the building, or located remotely.

The user device 108 includes a network interface circuit 126, a processing circuit 128, and an input/output circuit 138. The network interface circuit 126 is used to establish connections with other computing systems by way of the network 140. The network interface circuit 126 includes program logic that facilitates connection of the user device 108 to the network 140. For example, the network interface circuit 126 may include any combination of a wireless network transceiver (e.g., a cellular modem, a Bluetooth transceiver, a Wi-Fi transceiver) and/or a wired network transceiver (e.g., an Ethernet transceiver). In some arrangements, the network interface circuit 126 includes the hardware and machine-readable media sufficient to support communication over multiple channels of data communication. Further, in some arrangements, the network interface circuit 126 includes cryptography capabilities to establish a secure or relatively secure communication session in which data communicated over the session is encrypted.

To provide the functions of the user device 108, the network interface circuit 126 provides a relatively high-speed link to the network 140, which may be any combination of a local area network (LAN), an intranet (e.g., a private banking or retailer network), the Internet, or any other suitable communications network, either directly or through another external interface.

The processing circuit 128 is made up of a memory 130, a processor 132, and a user client application 134. The memory 130 includes one or more memory devices (e.g., RAM, NVRAM, ROM, Flash Memory, hard disk storage) that store data and/or computer code for facilitating the various processes described herein. That is, in operation and use, the memory 130 stores at least portions of instructions and data for execution by the processor 132 to control the functionality of the processing circuit 128. Moreover, the memory 130 may be or include tangible, non-transient volatile memory or non-volatile memory. The processor 132 may be implemented as a general-purpose processor, an application specific integrated circuit (ASIC), one or more field programmable gate arrays (FPGAs), a digital signal processor (DSP), a group of processing components, or other suitable electronic processing components. As such, the user device 108 is configured to run a variety of application programs and store associated data in a database of the memory 130. One such application may be the user client application 134.

The user client application 134 is structured to provide displays to the user device 108 that enable the user to manage interactions with the various elements of the autonomous security system 100. The user client application 134 provides the user device 108 with the ability to obtain video and audio information (e.g., a video stream or an audio stream) from the building security system 102 and the UAV security system 104. The user client application 134 is further configured to allow the user of user device 108 to give commands to the UAV security system 104. Accordingly, the user client application 134 is communicably coupled to the security computing system 106 (e.g., building inspection circuit 178) and/or to the building security system 102 (e.g., data collection circuit 122) and/or UAV security system 104 (e.g., spatial recognition circuit 154). The user client application 134 may be downloaded by the user device 108 prior to its usage, hard coded into the memory 130 of the user device 108, or be a web-based interface application such that the user device 108 may provide a web browser to the application, which may be executed remotely from the user device 108.

In the latter instance, the user may have to log onto or access the web-based interface before usage of the application. Further, and in this regard, the user client application 134 may be supported by a separate computing system including one or more servers, processors, network interface circuits, etc. that transmit applications for use to the user device 108. In certain embodiments, the user client application 134 includes an application programming interface (API) and/or a software development kit (SDK) that facilitate the integration of other applications with the user client application 134.

In some embodiments, the user client application 134 may be configured to utilize the functionality of the UAV security system 104 by interacting with a UAV client application 150 and/or the building security system 102 by interacting with a building client application 118. Accordingly, the user client application 134 may be communicably coupled with the building security system 102 and the UAV security system 104 to allow the user to view the video and audio data from the security systems, as well as guide or instruct a UAV 190 associated with the UAV security system 104 to change position for a better vantage point. The user client application 134 is further structured to receive notifications from the security computing system 106 through the security client application 168.

The user client application 134 is a network-based or web application. Accordingly, the user device 108 includes software and/or hardware capable of implementing a network-based or web application. Further, the user client application 134 includes software such as HTML, XML, WML, SGML, PHP (Hypertext Preprocessor), CGI, and like languages.

The display presented to the user via the user client application 134 may provide a prompt to the user to provide security preference information to the system 100. For example, in some arrangements, the user client application 134 may prompt the user to provide a time at which they would like the UAV security system 104 to start or finish the opening or closing procedure. In some instances, the user may want to deploy the UAV security system 104 outside of opening and closing procedures (e.g., upon a threat being detected manually). For example, if a user (e.g., an employee of the provider or a third party security agency) thinks they see movement while entering a building, is told by a customer or other entity that suspicious behavior is occurring in or around the provider location, or is otherwise notified that suspicious behavior is or may be occurring, the user may request that the UAV security system 104 be deployed via the user client application 134. In this instance, the user may be prompted via the user client application 134 to determine whether the UAV security system 104 should follow a normal route or fly to one particular point directly. In other embodiments, the user may deploy the UAV security system 104 via the user client application 134 to determine if any structural damage to the building has occurred (e.g., after an earthquake or a tornado). The determination of structural damage may be determined by a structural analysis artificial intelligence (AI) circuit 180 of the security computing system 106, as will be further discussed herein.

In some embodiments the user device 108 is an augmented reality interface that allows the user to take control of the UAV security system 104 and guide the UAV security system 104 (e.g., using a video feed captured by the UAV security system 104) in real time via the user client application 134.

The network interface circuit 126 is used to establish connections with other computing systems by way of the network 140. The network interface circuit 126 includes program logic that facilitates connection of the user device 108 to the network 140. For example, the network interface circuit 126 may include any combination of a wireless network transceiver (e.g., a cellular modem, a Bluetooth transceiver, a Wi-Fi transceiver) and/or a wired network transceiver (e.g., an Ethernet transceiver). In some arrangements, the network interface circuit 126 includes the hardware and machine-readable media sufficient to support communication over multiple channels of data communication. Further, in some arrangements, the network interface circuit 126 includes cryptography capabilities to establish a secure or relatively secure communication session in which data communicated over the session is encrypted.

To provide the functions of the user device 108, the network interface circuit 126 provides a relatively high-speed link to the network 140, which may be any combination of a local area network (LAN), an intranet (e.g., a private banking or retailer network), the Internet, or any other suitable communications network, either directly or through another external interface.

The input/output circuit 138 is structured to receive communications from and provide communications to the user associated with the user device 108 (e.g., an employee associated with the provider or a third party security agency). In this regard, the input/output circuit 138 is structured to exchange data, communications, instructions, etc. with an input/output component of the user device 108. Accordingly, in one embodiment, the input/output circuit 138 includes an input/output device. In another embodiment, the input/output circuit 138 includes communication circuitry for facilitating the exchange of data, values, messages, and the like between an input/output device and the components of the user device 108. In yet another embodiment, the input/output circuit 138 includes machine-readable media for facilitating the exchange of information between an input/output device and the components of the user device 108. In still another embodiment, the input/output circuit 138 includes any combination of hardware components, communication circuitry, and machine-readable media.

For example, in some embodiments, the input/output circuit 138 comprises suitable input/output ports and/or uses an interconnect bus (not shown) for interconnection with a local display (e.g., a touchscreen display) and/or keyboard/mouse devices (when applicable), or the like, serving as a local user interface for programming and/or data entry, retrieval, or manipulation purposes. That is, the input/output circuit 138 provides an interface for the user to interact with various applications (e.g., the user client application 134) stored on the user device 108.

The building security system 102 may similarly include a processing circuit 112, a network interface circuit 110, and an input/output circuit 124. The processing circuit 112, the network interface circuit 110, and the input/output circuit 124 may function substantially similar to and include the same or similar components as the processing circuit 128, the network interface circuit 126, and the input/output circuit 138 described above, with reference to the user device 108. Accordingly, it will be understood that the description of the processing circuit 128, the network interface circuit 126, and the input/output circuit 138 provided above may be applied to the processing circuit 112, the network interface circuit 110, and the input/output circuit 124 of the building security system 102.

For example, the processing circuit 112 includes a memory 114, a processor 116, the building client application 118, and the data collection circuit 122. The memory 114 and the processor 116 are substantially similar to the memory 130 and the processor 132 described above. As such, the building security system 102 is configured to run a variety of application programs and store associated data in a database of the memory 114. One such application may be the building client application 118.

The data collection circuit 122 comprises video and audio recording devices (e.g., security cameras), as well as various other sensors (e.g., thermal sensors, night-vision sensors, radio-frequency identifier (RFID) sensors, infra-red (IR) sensors), near-field communication (NFC) sensors), configured to capture various monitoring data (e.g., video data, audio data, and various other sensor data) that may be used to monitor the provider location. For example, the data collection circuit 122 may be configured to collect the monitoring data from the various recording devices and sensors and send the monitoring data to the security computing system 106 to be used to monitor the provider location.

The building client application 118 is structured to provide displays to the building security system 102 that enable a user to view and manage the various devices and other sensors of the provider location. The data collection circuit 122 may contain various camera feeds (e.g., live video, stored video, partially stored video, still images) from the recording devices and sensors. Accordingly, the building client application 118 is communicably coupled to the user device 108 (e.g., the user client application 134) and/or the security computing system 106 (e.g., security client application 168).

In some embodiments, the building client application 118 may be incorporated with an existing application in use by the building security system 102 (e.g., the security client application 168, a mobile security application, a service provider application). In other embodiments, the building client application 118 is a separate software application implemented on the building security system 102. The building client application 118 may be downloaded by the building security system 102 prior to its usage, hard coded into the memory 114 of the building security system 102, or be a web-based interface application such that the building security system 102 may provide a web browser to access the application, which may be executed remotely from the building security system 102.

In the latter instance, the user (e.g., a provider employee) may have to log onto or access the web-based interface before usage of the application. Further, and in this regard, the building client application 118 may be supported by a separate computing system including one or more servers, processors, network interface circuits, etc. that transmit applications for use to the building security system 102. In certain embodiments, the building client application 118 includes an application programming interface (API) and/or a software development kit (SDK) that facilitate the integration of other applications with the building client application 118.

In some embodiments, the building client application 118 is configured to utilize the functionality of the security computing system 106 by interacting with the security client application 168 and/or the UAV security system 104 by interacting with the UAV client application 150. Accordingly the building client application 118 may be communicably coupled with the user device 108, the UAV security system 104, and the security computing system 106 to perform a variety of functions. For example, the building client application 118 is configured to send live video, audio, and other sensor information captured by the data collection circuit 122 to the security computing system 106 to be analyzed (e.g., by the threat analysis AI circuit 174) to determine whether a threat has occurred. The security computing system 106 may then provide notifications to the user device 108 if a threat is detected.

In some embodiments, the building security system 102 includes various additional building components (e.g., gates, doors, keypads, card readers, HID readers), building status subsystems (e.g., secure, alarm, fault, active, inactive), and camera feeds (e.g., live video, stored video, partially stored video, still images, etc.), which may be used in conjunction with any of the various systems, device, and methods described herein.

The UAV security system 104 is configured to control operation of a UAV 190 to monitor a provider location. The UAV security system 104 may similarly include a processing circuit 144, a network interface circuit 142, and an input/output circuit 158. The processing circuit 144, the network interface circuit 142, and the input/output circuit 158 may function substantially similar to and include the same or similar components as the processing circuit 128, the network interface circuit 126, and the input/output circuit 138 described above, with reference to the user device 108. Accordingly, it will be understood that the description of the processing circuit 128, the network interface circuit 126, and the input/output circuit 138 provided above may be applied to the processing circuit 144, a network interface circuit 142, and an input/output circuit 158 of the UAV security system 104.

For example, the processing circuit 144 includes a memory 146, a processor 148, the UAV client application 150, the data collection circuit 156, and the spatial recognition circuit 154. The memory 146 and the processor 148 are substantially similar to the memory 130 and the processor 132 described above. As such, the UAV security system 104 is configured to run a variety of application programs and store associated data in a database of the memory 146. One such application may be the UAV client application 150.

The UAV security system 104 is configured to utilize the data collection circuit 156 to collect various monitoring data pertaining to the provider location. For example, the data collection circuit 156 may include or be communicably coupled to various video and audio capturing devices, as well as ultra-wide band radio signals, RFID sensors, infra-red sensors, and night vision technology. These sensors can be used individually or in conjunction. The data collection circuit 156 may capture various information and/or camera feeds (e.g., live video, stored video, partially stored video, still images) from the various video capturing devices, audio capturing devices, and other sensors to be used to monitor the provider location.

The UAV client application 150 is structured to provide displays to the building security system 102, the UAV security system 104 (if arranged remotely from the UAV 190), the security computing system 106, and/or the user device 108, that enable users to view collected monitoring data (e.g., live-streamed data feeds) from the video, audio, and various other sensors of the UAV security system 104 to monitor the provider location and guide the UAV 190. Accordingly, the UAV client application 150 is communicably coupled to the user device 108 (e.g., the user client application 134), the security computing system 106 (e.g., security client application 168) and/or the building security system 102 (e.g., building client application 118).

In some embodiments the data collection circuit 156 utilizes one or more of video cameras, audio recording devices, ultra-wideband radio (UWB) sensors, RFID sensors, infra-red (IR) sensors, night vision sensors, and/or a variety of other suitable sensors to obtain real-time monitoring data pertaining to the provider location. For example, in some instances, the data collection circuit 156 may utilize UWB sensors to obtain the monitoring data. The UWB sensors may be configured to sense various objects through walls or other materials using detected differences in material density. Accordingly, the UWB sensor data collected by the UWB sensors may be sent by the data collection circuit 156 (e.g., via the UAV client application 150) to the security computing system 106, which may use the UWB sensor data to obtain and/or generate a real-time picture or other real-time rendering (e.g., a two-dimensional or three dimensional map) of the interior and/or exterior of the provider location. Accordingly, in some instances, the UWB sensor data may be utilized to monitor the interior and/or exterior of the provider location. For example, in some instances, the UWB sensors may use frequencies within the frequency spectrum of 3.1 to 10.6 GHz. The UWB sensors may further be configured to provide a high-frequency bandwidth of more than 500 MHz and very short pulse signals (less than 1 ns), thereby allowing for very high data transfer rates.

Accordingly, in some instances, the UWB sensors may further be configured to allow for data communication between the UAV 190 (e.g., the UAV security system 104) and the various other components of the autonomous security system 100 (e.g., the building security system 102, the security computing system 106, the user device 108). UWB radio communication signals are more covert and harder to detect than non-UWB radio communication signals due to the signal occupying a large bandwidth and the utilizing a unique randomizing timing code at millions of bits/s. Each bit is typically represented by a large number of pulses of very low amplitude typically below the noise level. In some instances, UWB signals can be made Rec. ITU-R SM.1755-05 noise-like. Accordingly, because UWB radio communication signals are difficult to detect, the UWB sensors may provide a secure form of communication between the UAV 190 and the various other components of the autonomous security system 100.

The UWB sensors may be used independently or in conjunction with various RFID sensors. For example, in some instances, a provider location may have thick concrete (or other dense material) walls, which may make it difficult for the UWB sensor to collect data and/or accurately sense objects on the interior of the provider location. In these instances, RFID chips can be placed at various locations throughout the provider location (in or on the walls, floor, and/or ceiling). As such, the RFID sensors of the data collection circuit 156 may sense the locations of the various RFID chips within the provider location and send (e.g., the UAV client application 150) the RFID sensor data (e.g., the sensed RFID chip locations) to the security computing system 106 to assist in obtaining and/or generating the real-time picture or other real-time rendering of the interior and/or exterior of the provider location.

For example, in some instances, the RFID chips may each be individually identifiable and may each be associated with a corresponding predetermined location within the provider location. As such, the RFID chips may provide a variety of locational anchor points throughout the provider location that may be sensed by the data collection circuit 156 and sent to security computing system 106 to be used in conjunction with the UWB sensor data to more accurately map the interior of the provider location. In some instances, the UAV security system 104 and/or the security computing system 106 may store an expected layout of the provider location (e.g., in the memory 146 or the memory 164), and the locational anchor points provided by the RFID chips may correspond to predetermined locations within the expected layout of the provider location. Accordingly, the RFID chip locations may be used to orient the expected layout of the provider location with the sensed layout (e.g., the monitoring data acquired by the UAV) of the provider location to more accurately map the interior of the provider location.

In some embodiments, the data collection circuit 156 utilizes one or more thermographic or infra-red (IR) sensors. The IR sensors can be used independently or in conjunction with a number of other sensors of varying sensor types (e.g., the UWB sensors, the RFID sensors, video cameras, audio capturing devices). The IR sensors may be one or more of an active IR sensor, a passive IR sensor, or a combination of an active IR sensor and a passive IR sensor. For example, an active IR sensor may emit an infrared beam and detect the amount of time it takes to detect the beam reflected and/or the intensity of the beam reflected, while the passive IR sensor may only receive IR signals (e.g., emitted from a human body). The IR sensors can be used to monitor an exterior of the provider location, as well as the surroundings of the provider location. The data collection circuit 156 can then send (e.g., via the UAV client application 150) the collected IR sensor data to the security computing system 106 to similarly obtain and/or generate a real-time picture or other real-time rendering (e.g., a two-dimensional or three dimensional map) of the exterior of the provider location, as well as the surrounding locations. Accordingly, in some instances, the IR sensor data may be utilized to monitor the exterior of the provider location.

In some embodiments the data collection circuit 156 utilizes one or more night vision cameras, devices, or other sensors. The night vision cameras, device, or other sensors can be used independently or in conjunction with a number of the other sensors or cameras (e.g., the UWB sensors, the RFID sensors, the IR sensors, video cameras, audio capturing devices). The data collection circuit 156 may send (e.g., via the UAV client application 150) the data from the night vision cameras, devices, or other sensors to the security computing system 106 to obtain and/or generate a real-time picture or other real-time rendering (e.g., a two-dimensional or three dimensional map) of the exterior of the provider location, as well as the surrounding locations. Accordingly, in some instances, the night vision camera, device, or sensor data may be utilized to monitor the exterior of the provider location.

It will be appreciated that the various sensors described above may be used individually or in conjunction, as necessary for a given scenario, to obtain and/or generate the real-time pictures and/or other real-time renderings of the interior, exterior, and surrounding area of the provider location to be used by the security computing system 106. It will further be appreciated that various other sensors (e.g., video cameras and/or audio devices) may be additionally or alternatively used by the data collection circuit 156 to acquire necessary monitoring data.

The UAV security system 104 may utilize the spatial recognition circuit 154 to automatically guide the UAV 190 along a predetermined route. The spatial recognition circuit 154 is configured to continuously determine the location, flight direction, and/or speed of the UAV 190 to safely guide the UAV 190 along the predetermined route. In some embodiments, the location, flight direction, and/or speed of the UAV 190 can be determined using a global positioning system (GPS). In some other embodiments, the location, flight direction, and/or speed of the UAV 190 may be determined using the monitoring data captured by the various sensors described above, with respect to the data collection circuit 156. In these instances, the spatial recognition circuit 154 may be configured to receive the monitoring data captured by the data collection circuit 156 and use the monitoring data to determine the location, flight direction, and/or speed of the UAV 190.

For example, in some instances, the location of the UAV 190 can be determined using proximity data obtained using the RFID sensors and chips described above (or any other suitable proximity related sensors). The spatial recognition circuit 154 may include or be in communication with various proximity sensors (e.g., the RFID sensors), and various proximity beacons (e.g., the RFID chips) may be arranged in and/or around the provider location. The proximity beacons may be sensed by various proximity sensors of the spatial recognition circuit 154 and used to determine the location, flight direction, and speed of the UAV 190. In some instances, the location, flight direction, and speed of the UAV 190 may be determined using a combination of GPS data, monitoring data, and/or proximity data.

In some instances, the spatial recognition circuit 154 can be used to automatically guide the UAV 190 along a predetermined route. For example, the predetermined route may follow a path between several predetermined points of interest around the provider location. The points of interest may be any of high traffic areas, areas of concern or vulnerability, areas prone to security threats, areas prone to structural damage, or any other predetermined points of interest around the provider location. In some instances, the spatial recognition circuit 154 can be additionally or alternatively be used to instruct the UAV 190 to follow a path to specific location determined, identified, or otherwise selected by the security computing system 106 or a user through the user device 108.

The spatial recognition circuit 154 is further configured to continuously analyze the monitoring data collected by the UAV 190 to identify any objects near the UAV 190. Accordingly, the spatial recognition circuit 154 may be configured to alter or otherwise modify the flight path of the UAV 190, as necessary, to avoid collisions with any objects arranged within the predetermined route of the UAV 190.

In some embodiments, the UAV client application 150 may be incorporated with an existing application in use by the building security system 102 (e.g., the security client application 168, a mobile security application, a service provider application). In other embodiments, the UAV client application 118 is a separate software application implemented on the UAV security system 104. The UAV client application 150 may be downloaded by the UAV security system 104 prior to its usage, hard coded into the memory 146 of the UAV security system 104, or be a web-based interface application such that the UAV security system 104 may provide a web browser to access the application, which may be executed remotely from the UAV security system 104.

In the latter instance, the user (e.g., a provider employee) may have to log onto or access the web-based interface before usage of the application. Further, and in this regard, the UAV client application 150 may be supported by a separate computing system including one or more servers, processors, network interface circuits, etc. that transmit applications for use to the UAV security system 104. In certain embodiments, the UAV client application 150 includes an application programming interface (API) and/or a software development kit (SDK) that facilitate the integration of other applications with the UAV client application 150.

In some embodiments, the UAV client application 150 is configured to utilize the functionality of the security computing system 106 by interacting with the security client application 168. Accordingly the UAV client application 150 may be communicably coupled with the user device 108, the building security system 102, and the security computing system 106 to perform a variety of functions. For example, the UAV client application 150 is configured to send monitoring data (e.g., live video, audio, and other sensor data) to the security computing system 106 to be used by the threat analysis AI circuit 174 to determine whether there is a threat near or at the provider location and/or by the building inspection circuit 178 to determine whether the provider location has been structurally damaged in any way. The security computing system 106 may then notify the user device 108 and/or the building security system 102 as necessary.

It will be appreciated that, although the UAV security system 104 is shown as being a part of the UAV 190, in many cases, all or part of the UAV security system 104 may be located remotely from the UAV 190, and may be configured to remotely control and/or obtain monitoring data using the UAV 190. In these instances, the various sensors described above, with respect to the data collection circuit 156 and the spatial recognition circuit 154, may be included within the UAV 190, and the UAV 190 may be configured to wirelessly communicate the GPS data, monitoring data, proximity data, and/or any other data captured by the various sensors of the UAV 190 back to the UAV security system 104 to be used to monitor the provider location and/or guide the UAV 190. As such, in some instances, a user of the UAV security system 104 may be able to remotely control the UAV 190 using the UAV client application 150 from a remote location.

The security computing system 106 is configured to receive various monitoring data from the building security system 102 and/or the UAV security system 104, analyze the monitoring data, and determine whether there are any active threats at or near the provider location or whether there is any structural damage at the provider location. The security computing system 106 may similarly include a processing circuit 162, a network interface circuit 160, and an input/output circuit 186. The processing circuit 162, the network interface circuit 160, and the input/output circuit 186 may function substantially similar to and include the same or similar components as the processing circuit 128, the network interface circuit 126, and the input/output circuit 138 described above, with reference to the user device 108. Accordingly, it will be understood that the description of the processing circuit 128, the network interface circuit 126, and the input/output circuit 138 provided above may be applied to the processing circuit 162, the network interface circuit 160, and the input/output circuit 186 of the security computing system 106.

For example, the processing circuit 162 similarly includes a memory 164 and a processor 166. However, the processing circuit 162 further includes a security client application 168, a security alert recognition circuit 172, and a building inspection circuit 178. The memory 164 and the processor 166 are substantially similar to the memory 130 and the processor 132 described above. As such, the security computing system 106 is configured to run a variety of application programs and store associated data in a database of the memory 164. One such application may be the security client application 168.

The security client application 168 is configured to collect monitoring data from the building security system 102 and the UAV security system 104 through the building client application 118 and the UAV client application 150, respectively. The security client application 168 may then be configured to obtain and/or generate a real-time picture/video or other real-time rendering (e.g., a two-dimensional or three dimensional map) of the interior and/or exterior of the provider location using the monitoring data. The security client application 118 may then communicate the monitoring data and the real-time picture/video or other real-time rendering of the interior and/or exterior of the provider location with the security alert recognition circuit 172 and the building inspection circuit 178 to determine whether there is a threat at or near the provider location or whether there is structural damage at the provider location. Upon determining that there is a threat or structural damage at or near the provider location, the security client application 168 is further configured to generate and provide an alert to appropriate users via the user device 108, the security computing system 106, the UAV security system 104, and/or the building security system 102, as necessary. Accordingly, the security client application 168 is communicably coupled to the user device 108 (e.g., the user client application 134), the UAV security system 104 (e.g., UAV client application 150), and/or the building security system 102 (e.g., building client application 118).

The security alert recognition circuit 172 is configured to receive the monitoring data from the building security system 102 and/or the UAV security system 104 via the security client application 168. The security alert recognition circuit 172 is then configured to analyze the monitoring data to determine whether a threat is present at or near the provider location. As used herein, the terms "threat," "potential threat," and "possible threat" may be used interchangeably, and are meant to cover threats currently taking place (e.g., immediate or imminent threats), as well as potential future threats (e.g., threats that may take place minutes, hours, or days in the future). In some embodiments, the security alert recognition circuit 172 includes a threat analysis artificial intelligence (AI) circuit 174 and a security database 176.

In some instances, the security alert recognition circuit 172 is configured to present the monitoring data to a user of the security computing system 106 via the security client application 168. The monitoring data may be presented as a real-time video feed, audio feed, or other sensor feed (e.g., the real-time picture or other real-time rendering of the interior and/or exterior of the provider location). In some instances, a real-time video feed may be viewed by itself. In some instances, the real-time video feed may have various sensor information overlaid over the real-time video as an augmented reality overlay. For example, in some instances, UWB, IR (thermal), and/or RFID chip location data captured by the data collection circuit 156 may be overlaid on top of a video feed. In some instances, the UWB and/or IR (thermal) may be overlaid on top of the video feed using a heat map style overlay (e.g., a thermographic overlay). The user may then manually analyze the monitoring data (e.g., the video feed with or without the heat map style overlay) to determine whether a threat is present.

In some other instances, the security alert recognition circuit 172 is configured to utilize the threat analysis AI circuit 174 to analyze the monitoring data and determine whether a threat is present. For example, the threat analysis AI circuit 174 is configured to incorporate artificial intelligence (AI) models to study various inputs received from users over time pertaining to determined threats within monitoring data, historical data pertaining to various determined threats within monitoring data, and/or pre-gathered threat detection training data (e.g., from a third-party threat detection software company) to learn to identify potential threats within the monitoring data. In some instances, the threat analysis AI circuit 174 may additionally or alternatively utilize pre-trained AI models obtained or accessed via an API or other communication method.

In some instances, the threat analysis AI circuit 174 may be further be configured to be continuously improved and/or refined by feedback provided by a user of the security computing system 106. For example, the threat analysis AI circuit 174 may initially flag an event within the monitoring data as being a threat and automatically notify a user of the security computing system 106 for verification. As such, the user of the security computing system 106 may view the monitoring data (e.g., the live video, audio, and/or other sensor feeds) and provide feedback (e.g., verification that a threat is present or an indication that a threat was incorrectly flagged when no threat was present). The AI models of the threat analysis AI circuit 174 may then update their training to reinforce or modify their future threat identifications based on the user's feedback.

The threat analysis AI circuit 174 (e.g., the AI models of the threat analysis AI circuit 174) may utilize an object detection model (e.g., computer vision, computational vision, simultaneous localization and mapping ("SLAM")) that uses the camera as well as other sensors (e.g., UWB sensor, RFID sensor, night vision) to identify various objects of interest. The objects of interest may comprise various objects that are relevant to the safety of the provider location. For example, the objects of interest may include specific people and/or vehicles who have been flagged as potential threats (e.g., using facial recognition, license plate identification), a person carrying a hidden gun or other weapon, a bomb, or any other suspicious and/or potentially threatening object. The threat analysis AI circuit 174 may also utilize a form of emotional AI (e.g., emotion recognition model, emotion detection technology) that has the ability to recognize the emotional state of people entering or exiting the provider location to determine if they pose a potential threat. Accordingly, the threat analysis AI circuit 174 is configured to differentiate between various potential threats and various non-threatening objects (e.g., non-threatening people, non-threatening vehicles, non-threatening animals).

The threat analysis AI circuit 174 may determine a confidence level associated with a detected threat. For example, in some instances, the confidence level may be a percentage likelihood of a threat existing, a numerical confidence score (e.g., a confidence score between one and ten) of a threat existing, a descriptive confidence score (e.g., low, medium, high), and/or a color scale (e.g., green for low confidence, yellow for medium confidence, red for high confidence) of a threat existing. In some instances, the threat analysis AI circuit 174 may be unsure, based on the received monitoring data, whether a threat is actually present. In these instances, the threat analysis AI circuit 174 may assign a low confidence level (e.g., 10%, one, low, green). Conversely, in some instances, the threat analysis AI circuit 174 may be very confident, based on the monitoring data, that a threat is present. In these instances, the threat analysis AI circuit 174 may assign a high confidence level (e.g., 90%, ten, high, red).

The threat analysis AI circuit 174 may further determine a severity level associated with a detected threat. For example, in some instances, the severity level may be a numerical security score (e.g., between one and ten) or a descriptive severity score (e.g., low, medium, high). In some instances, the threat analysis AI circuit 174 may determine that a threat is a low severity level threat. Low severity level threats may include, for example, an unknown vehicle being parked at or near the provider location for an extended period of time, an unknown vehicle passing by the provider location several times within a single day, a person approaching the provider location and being determined to look angry or otherwise unhappy or suspicious, etc. In some other instances, the threat analysis AI circuit 174 may determine that a threat is a high severity level threat. High severity level threats may include, for example, a person with a weapon being detected approaching the provider location, a bomb being detected at or near the provider location, a detected attempted robbery, a broken window or door being detected, etc.

The building inspection circuit 178 is similarly configured to receive the monitoring data from the building security system 102 and/or the UAV security system 104 via the security client application 168. The building inspection circuit 178 is then configured to analyze the monitoring data to determine whether any functional or structural defects (e.g., gas leaks, cracked foundations, broken windows) and/or cosmetic defects (e.g., graffiti, scraped/deformed siding) are present at or near the provider location. In some embodiments, the building inspection circuit 178 includes a structural analysis AI circuit 180 and a building database 182.

In some instances, the building inspection circuit 178 is similarly configured to present the monitoring data to a user of the security computing system 106 via the security client application 168. The monitoring data may be presented to the user in the same manner as described above, with reference to the security alert recognition circuit 172. The user may then manually analyze the monitoring data (e.g., the video feed with or without the heat map style overlay) to determine whether any functional, structural, and/or cosmetic defects are present at the provider location.

In some other instances, the building inspection circuit 178 is configured to utilize the structural analysis AI circuit 180 to analyze the monitoring data and determine whether any functional, structural, and/or cosmetic defects are present at the provider location. For example, the structural analysis AI circuit 180 is similarly configured to incorporate artificial intelligence (AI) models to study various inputs received from users over time pertaining to detected functional, structural, and/or cosmetic defects identified within monitoring data, historical data pertaining to detected functional, structural, and/or cosmetic defects identified within monitoring data, and/or pre-gathered functional, structural, and/or cosmetic defect training data (e.g., from a third-party company specializing in the automated detection of functional, structural, and/or cosmetic building defects) to learn to identify functional, structural, and/or cosmetic defects within the monitoring data. In some instances, the structural analysis AI circuit 180 may additionally or alternatively utilize pre-trained AI models obtained or accessed from an external server via an API or other communication method.

The structural analysis AI circuit 180 may further utilize a building information model (e.g., an expected provider location layout stored in the building database 182) to comparatively identify discrepancies between the building information model and the real-time picture/video or other real-time rendering of the interior and/or exterior of the provider location obtained or generated by the security alert recognition circuit 172. Based on the identified discrepancies, the structural analysis AI circuit 180 may identify any functional, structural, and/or cosmetic defects at the provider location, as well as determine their severity.

In some instances, the structural analysis AI circuit 180 may be configured to create the building information model based on the real-time picture/video or other real-time rendering of the interior and/or exterior of the provider location at a point in time when the provider location is known to not have any functional, structural, and/or cosmetic defects. For example, an employee associated with the provider may perform a manual assessment of the provider location prior to the monitoring data being captured by the building security system 102 and/or the UAV security system 104, and may determine that the provider location does not have any functional, structural, and/or cosmetic defects. The employee may then provide an indication via the building security system 102, the UAV security system 104, the security computing system 106, or the user device 108 that the manual assessment has been completed and that the provider location does not have any functional, structural, and/or cosmetic defects. Upon receipt of the indication from the employee, the structural analysis AI circuit 180 may be configured to automatically establish a baseline building information model based on real-time picture/video or other real-time rendering of the interior and/or exterior of the provider location. The baseline building information model may then be updated periodically (e.g., daily, weekly, monthly) to account for any intended or incremental functional, structural, and/or cosmetic changes to the provider location.

In some embodiments, the security alert recognition circuit 172 may be configured to automatically send commands to the UAV security system 104 to deploy the UAV to perform building inspections (e.g., to obtain monitoring data to determine whether threats and/or any structural, functional, and/or cosmetic defects are present) on a regular basis. For example, building inspections can be done at open and close of the provider location daily. In other embodiments, the building inspections can be done daily, weekly, or as scheduled by the user. In further embodiments, building analyses can be selectively performed in response to a user command provided via any of the building security system 102, the UAV security system 104, the security computing system 106, or the user device 108. For example, a user may command the building security system 102 and/or the UAV security system 104 to perform a building inspection in the case of manually detected threats and/or in the case of incidents that may affect the function or structure of the building (e.g., a car crashing into the provider location, a tornado, a flood, an earth quake). The structural analysis AI circuit 180 may similarly determine a confidence level associated with a detected functional, structural, or cosmetic defect. The confidence level of the structural, functional, and/or cosmetic defect may similarly be a percentage likelihood of a structural, functional, and/or cosmetic defect existing, a numerical confidence score of a structural, functional, and/or cosmetic defect existing, and/or a descriptive confidence score of a structural, functional, and/or cosmetic defect existing. The confidence level may be assigned similarly to the confidence score of the detected threat discussed above, with respect to the threat analysis AI circuit 174.

The structural analysis AI circuit 180 may further similarly determine a severity level associated with a detected functional, structural, or cosmetic defect. The severity level may similarly be a numerical severity level score and/or a descriptive severity level score. In some instances, the structural analysis AI circuit 180 may determine that a detected functional, structural, or cosmetic defect is a low severity level. Low severity level functional, structural, or cosmetic defects may be defects that are non-dangerous and/or non-offensive. For example, low severity level defects may include non-offensive graffiti, a newly-formed sidewalk crack, warped siding, or any other non-dangerous defects associated with the provider location. High severity level functional, structural, or cosmetic defects may be defects that are dangerous and/or offensive. For example, high severity level defects may include offensive graffiti, a broken window, a broken or leaking gas line, or any other dangerous and/or offensive defects.

The notification circuit 184 may utilize the security alert recognition circuit 172 and the building inspection circuit 178 to determine both whether a notification is necessary and, if so, who needs to be notified. For example, upon identifying a threat and/or a defect, the threat analysis AI circuit 174 and/or the building inspection circuit 178 are configured to provide data indicating as much to the notification circuit 184. The notification circuit 184 is then configured to generate an alert and send the alert to a variety of appropriate parties. For example, in some instances, the alert may be sent to a user (e.g., a provider employee, a branch manager, a security employee) of a particular device or system via the device or system (e.g., the user device 108, the security computing system 106, the UAV security system 104, the building security system 102, a third party security system). In some instances the alert may further be sent to a plurality of employees associated with the provider location (e.g., via text messages, emails, automated phone calls, push notifications), other provider locations in the same geographic region as the provider location (e.g., within five, ten, fifty, or a hundred miles), a third-party security system or agency, local authorities, and/or any other appropriate party.

In some instances, the threat analysis AI circuit 174 and/or the building inspection circuit 178 are further configured to provide both the confidence level and the severity level of the threat and/or the defect to the notification circuit 184. Accordingly, the notification circuit 184 may be configured to provide the alert to different parties based on the confidence level and the severity level assigned to the threat and/or defect. For example, if the threat and/or defect is given a low confidence level, the notification circuit 184 may only send the alert to a user of the security computing system 106 to verify whether or not the threat and/or defect is actually present. If the user verifies the threat, the alert may then be sent to additional parties. However, if the threat and/or defect is given a high confidence level, the notification circuit 184 may automatically send the alert to any or all of the appropriate parties discussed above, depending on the severity level of the threat and/or defect. Further, if the threat and/or defect is given a low severity level, the notification circuit 184 may only send the alert to the user of the security computing system 106. However, if the threat and/or defect is given a high severity level, the notification circuit 184 may automatically send the alert to any or all of the appropriate parties discussed above. Specifically, the notification circuit 184 may be configured to automatically send an alert to local authorities (e.g., local law enforcement, local fire department, local emergency medical technicians) indicating that a high severity threat and/or defect has been detected at the provider location.

In some embodiments, the user can set a confidence level threshold and/or a severity level threshold associated with detected threats and/or defects at which the notification circuit 184 is allowed to automatically notify the local authorities directly. In some other embodiments, the user can choose to have all threat and/or defect notifications directed to one or more particular devices or systems (e.g., the user device 108, the security computing system 106, the UAV security system 104, the building security system 102, a third party security system) to allow for one or more appropriate users to determine if the local authorities should be notified.

In other embodiments, the notification circuit 184 may further be configured to provide a notification to a user (e.g., a scheduled opening or closing manager of the provider location) to notify them of a successful routine check by the UAV security system 104 in which no threats or defects were detected.

It will be appreciated that although the security alert recognition circuit 172, the building inspection circuit 178, and the notification circuit 184 are depicted as being a part of the security computing system 106, other configurations may be utilized. For example, in some instances, the UAV security system 104 may additionally or alternatively include a security alert recognition circuit 172, a building inspection circuit, and/or a notification circuit that are similar or identical to the security alert recognition circuit 172, the building inspection circuit 178, and the notification circuit 184 discussed above. Accordingly, in these instances, the UAV security system 104 may be configured to automatically detect threats and/or defects and generate appropriate alerts, as described above, with respect to the security alert recognition circuit 172, the building inspection circuit 178, and the notification circuit 184.

Figure 2:
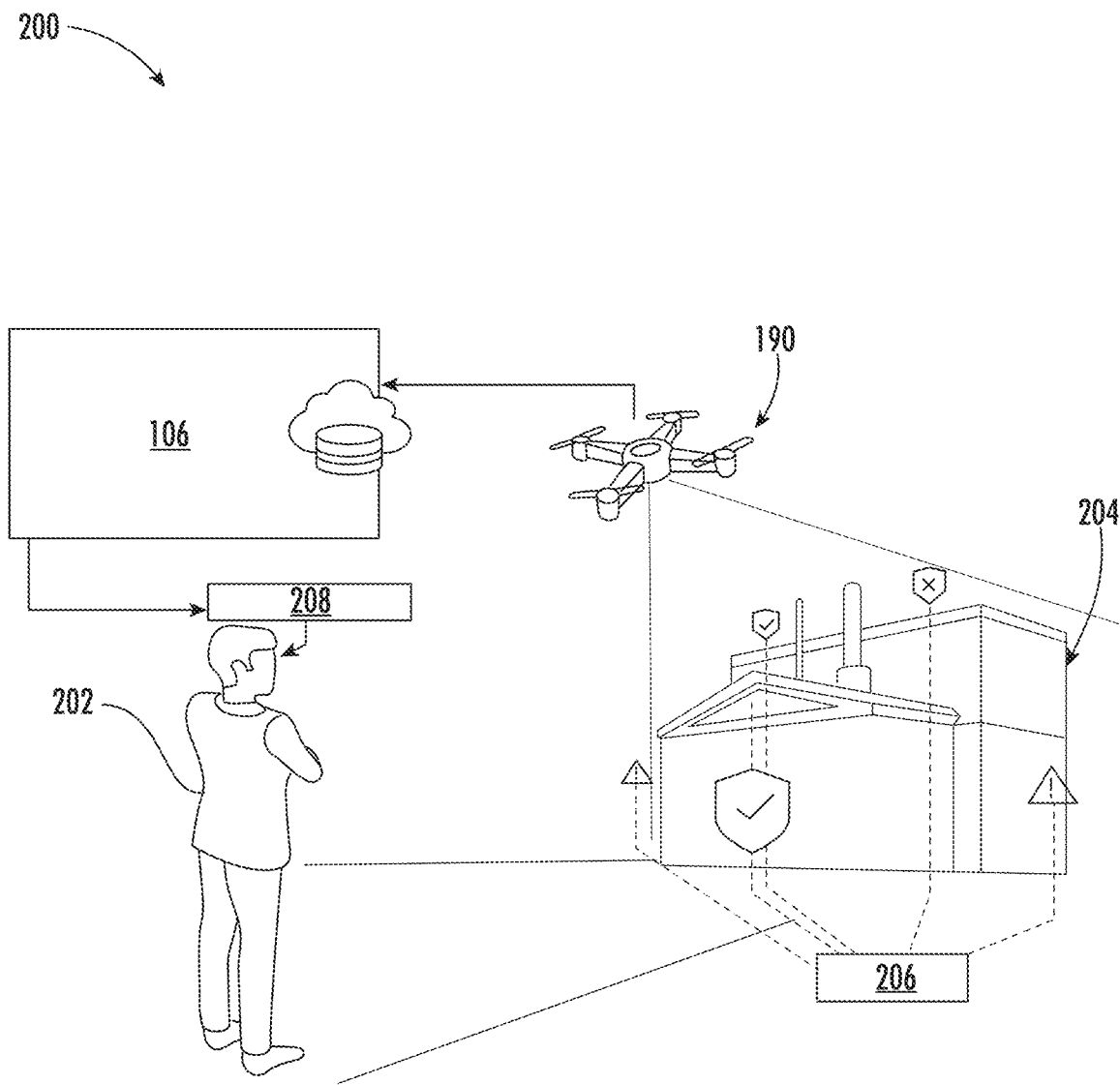
FIG. 2 is an illustration of a user utilizing an augmented reality (AR) headset and the display of AR overlay alert items on the live image of a provider location, according to an example embodiment.

Referring to FIG. 2, an illustration of a user 202 utilizing an AR headset 208 providing an AR overlay 206 including various alert items overlaid over a live image of a provider location 204 is shown, according to an example embodiment. In one embodiment, the UAV 190 captures monitoring data of the provider location 204 and transmits the monitoring data to the security computing system 106. Using this monitoring data, the security computing system 106 may analyze the monitoring data and determine any threats and/or structural, functional, and/or cosmetic defects at or near the provider location 204 using any of the various methods and/or capabilities of the autonomous security system 100 described herein. The determined threats and/or defects may be presented to the user in the form of an AR overlay 206. The AR overlay 206 may display alerts, recommendations, etc. As illustrated, in some embodiments, the user may view the AR overlay 206 using the AR headset 208. The AR headset 208 may be in communication with or otherwise incorporated with the user device 108, described above. It will be appreciated that the AR overlay 206 may be viewed using any suitable user device (e.g., the user device 108), as described herein.

Figure 3A:
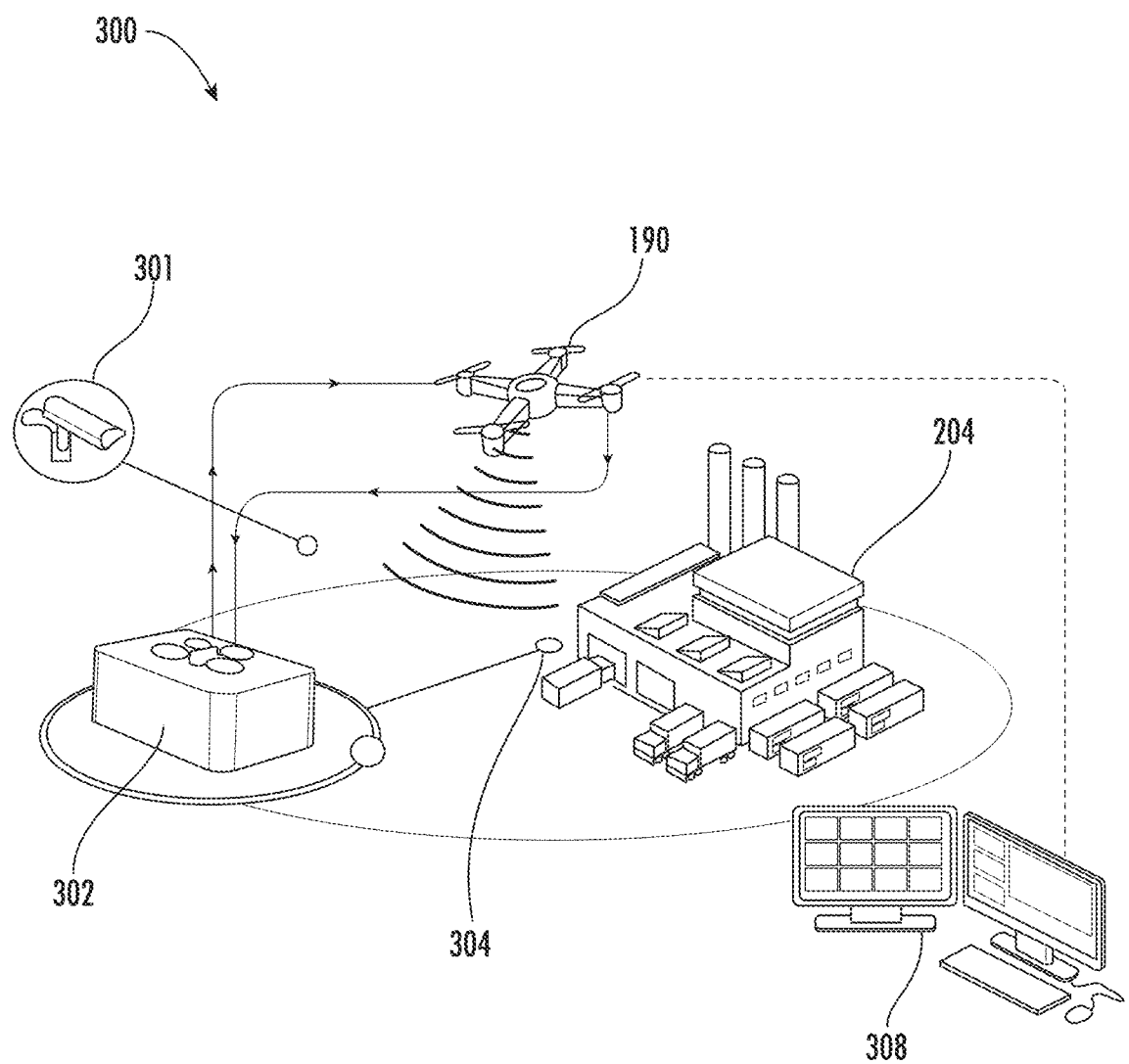
FIG. 3A is an illustration of an unmanned aerial vehicle (UAV) being alerted to a possible threat detected by the building security system at a provider location, according to an example embodiment.

Referring to FIG. 3A, an illustration of an unmanned aerial vehicle (UAV) 190 being alerted to a possible threat detected by the building security system 102 at the provider location 204 is shown, according to an example embodiment. In one embodiment, a sensor 301 that is in communication with the building security system 102 is triggered and the UAV 190 takes off from the UAV base 302. The UAV 190 then scans the threat to collect real-time monitoring data and sends the monitoring data to a computing device 308 (e.g., associated with the building security system 102, the security computing system 106, and/or the user device 108) to be used to assess the threat.

In some embodiments, the UAV base 302 may be on the site of the provider location 204, in other embodiments, the UAV base 302 is located at a remote location (e.g., within a few miles of the provider location 204). If the UAV base 302 is a different location than the provider location 204, a precision landing center 304 may be used at the provider location 204. The precision landing center 304 may be used to charge the UAV 190 prior to returning to the base 302. In other embodiments, the precision landing center 304 allows for a wired transmittal of collected monitoring data from the UAV 190 to the computing device 308 and/or protection for the UAV 190 if the UAV 190 is determined to be in danger (e.g., hail, high winds).

Figure 3B:
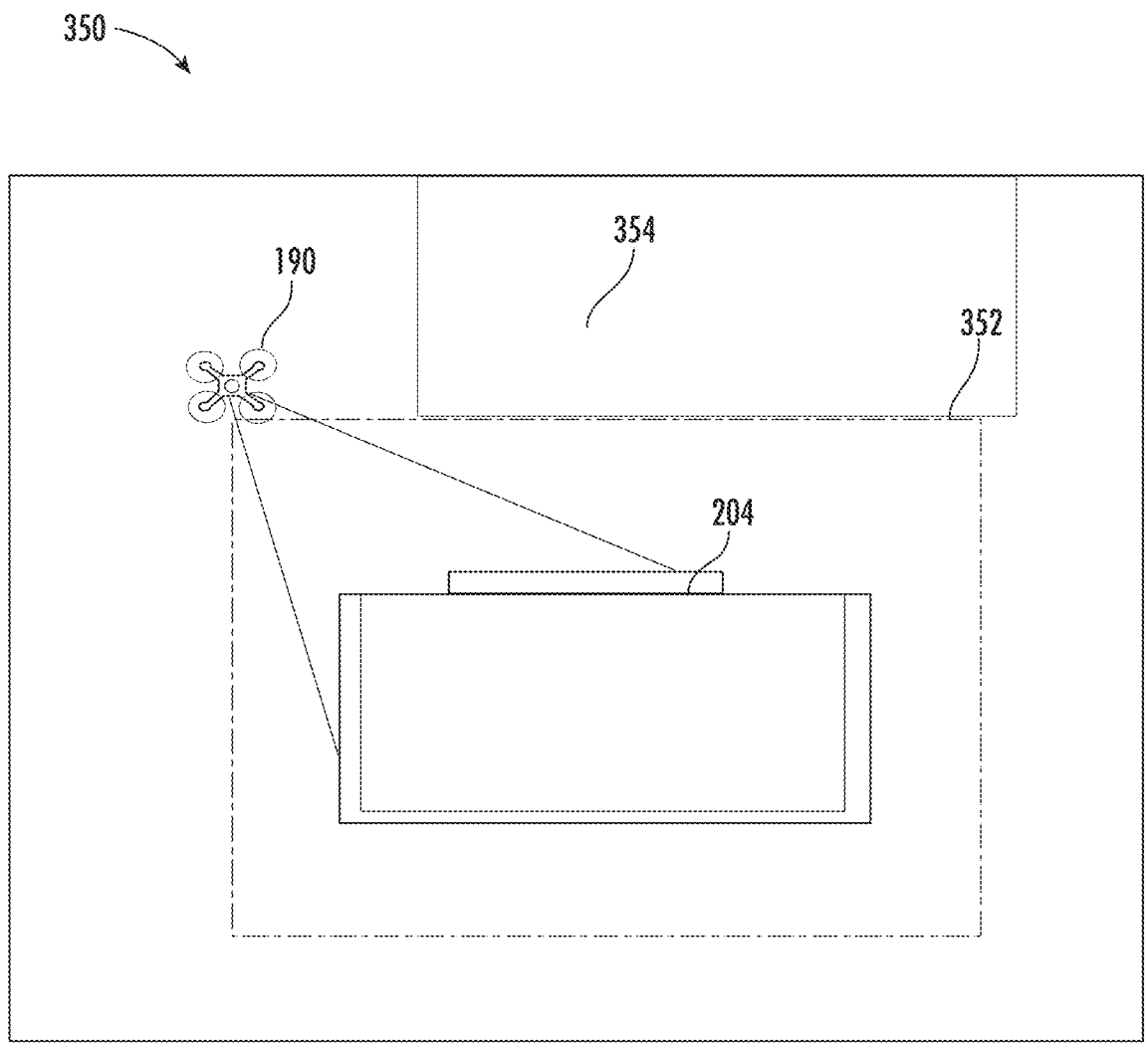
FIG. 3B is an illustration of a predetermined route near the provider location for the UAV of FIG. 3A, according to an example embodiment.

Referring to FIG. 3B, an illustration of a UAV 190 following a predetermined route 352 near the provider location 204 is shown, according to an example embodiment. In some embodiments, the predetermined route 352 is set to allow the UAV 190 to monitor the provider location 204. In some instances, the predetermined route 352 is additionally set to allow the UAV 190 to monitor a surrounding area 354 (e.g., a parking lot) associated with the provider location 204, where applicable. In some embodiments, the predetermined route 352 is set such that the UAV 190 follows along or near to an entire perimeter of the provider location 204 in a single pass. In other embodiments, the predetermined route 352 is set such that the UAV 190 only follows a portion of the perimeter of the provider location 204 (e.g., a particular storefront or other location at a strip mall). In further embodiments, the predetermined route 352 is set such that the UAV 190 travels around or near to the provider location 204 and/or throughout the surrounding area 354 multiple times (e.g., zig-zagging through large parking lots, circling the provider location 204 at differing heights). In yet further embodiments, the predetermined route 352 is set such that the UAV 190 travels along a route that is partially or wholly inside the provider location 204.

Figure 4:
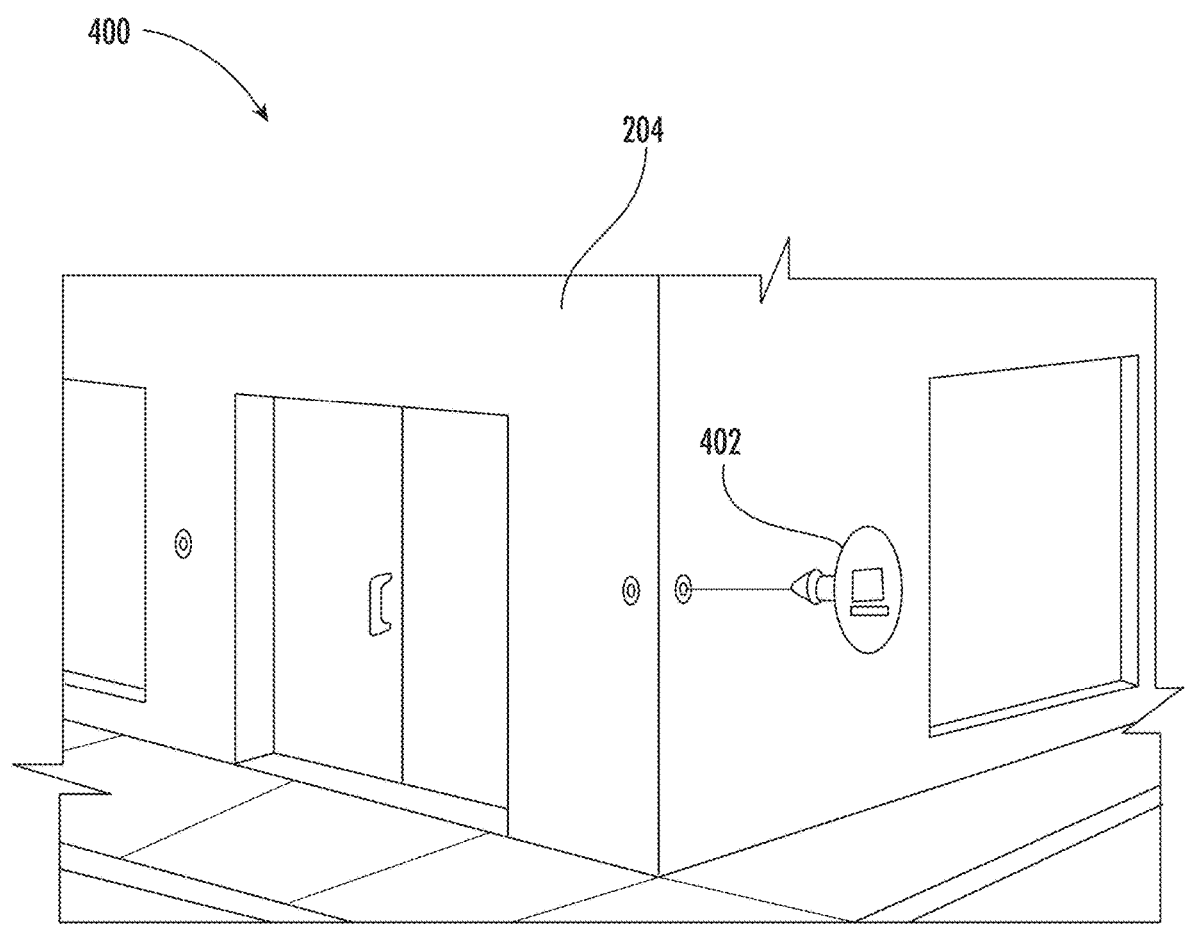
FIG. 4 is an illustration of a RFID chip embedded, fixed, or otherwise coupled to a wall of the provider location, according to an example embodiment.

Referring to FIG. 4, an illustration of a radio frequency identification (RFID) chip 402 embedded, fixed, or otherwise coupled to a wall of the provider location 204, according to an example embodiment. In some embodiments, RFID chips 402 are placed on or embedded within various structural components (e.g., walls, ceilings, floors, support beams) in or around the provider location 204. The RFID chips 402 may be sensed by the RFID sensor of the UAV 190 to enhance the spatial recognition of the UAV 190 with respect to the provider location 204. For example, the RFID chips 402 may be used in conjunction with the UWB sensor to improve the accuracy of obtained and/or generated real-time pictures and/or other real-time renderings of the interior and/or exterior of the provider location 204 by providing locational anchor points throughout the provider location 204 that aid in the locating of thick walls that would otherwise obscure the UWB signal, as described above. In one embodiment, the UAV 190 may utilize the RFID chips 402 in conjunction with the UWB signals to complete a route within the provider location 204.

Furthermore, in some instances, as noted above, the RFID chips 402 may be further utilized to aid the UAV security system 104 in determining the location, flight direction, and speed of the UAV 190. For example, in some embodiments, the RFID sensor data may be used in conjunction with the GPS data and/or the monitoring data obtained by the UAV 190 (e.g., the UAV security system 104) to confirm the location of the UAV 190 at a certain point in time. In some instances, the UAV 190 may use the locational anchor point provided by an RFID chip 402 to determine a general location of the UAV 190 with respect to the locational anchor point provided by the corresponding RFID chip 402. In some instances, the UAV 190 may further use two or more RFID chips 402 to triangulate the location of the UAV 190 with respect to the provider location 204. Accordingly, in some instances, the various locational anchor points provided by the RFID chips 402 may provide a locational check or a secondary source of location that may be used to confirm and/or to more accurately determine the location, flight direction, and speed of the UAV 190.

For example, in some instances, the UAV 190 (e.g., the UAV security system 104) may first determine an initial location determination using GPS data and/or monitoring data, as described above. Then, once the initial location determination has been determined based on the GPS data and/or the monitoring data, the UAV 190 may additionally determine a secondary location determination of the UAV 190 relative to the provider location 204 using the locational anchor points provided by one or more RFID chips 402. The second location estimate may be a determination of the location of the UAV 190 at the time the initial location determination was determined. Accordingly, the UAV 190 may then compare the initial location determination with the second location determination to confirm and/or to more accurately determine the location of the UAV 190.

It will be appreciated that the aforementioned locational check or secondary source of location provided may be utilized at multiple points in time to additionally confirm and/or more accurately determine the flight direction, and/or speed of the UAV 190. Furthermore, in some instances three different location determinations may be independently made using the GPS data, the monitoring data, and the RFID chips 402 to further confirm and/or more accurately determine the location, flight direction, and/or speed of the UAV 190.

Figure 5:
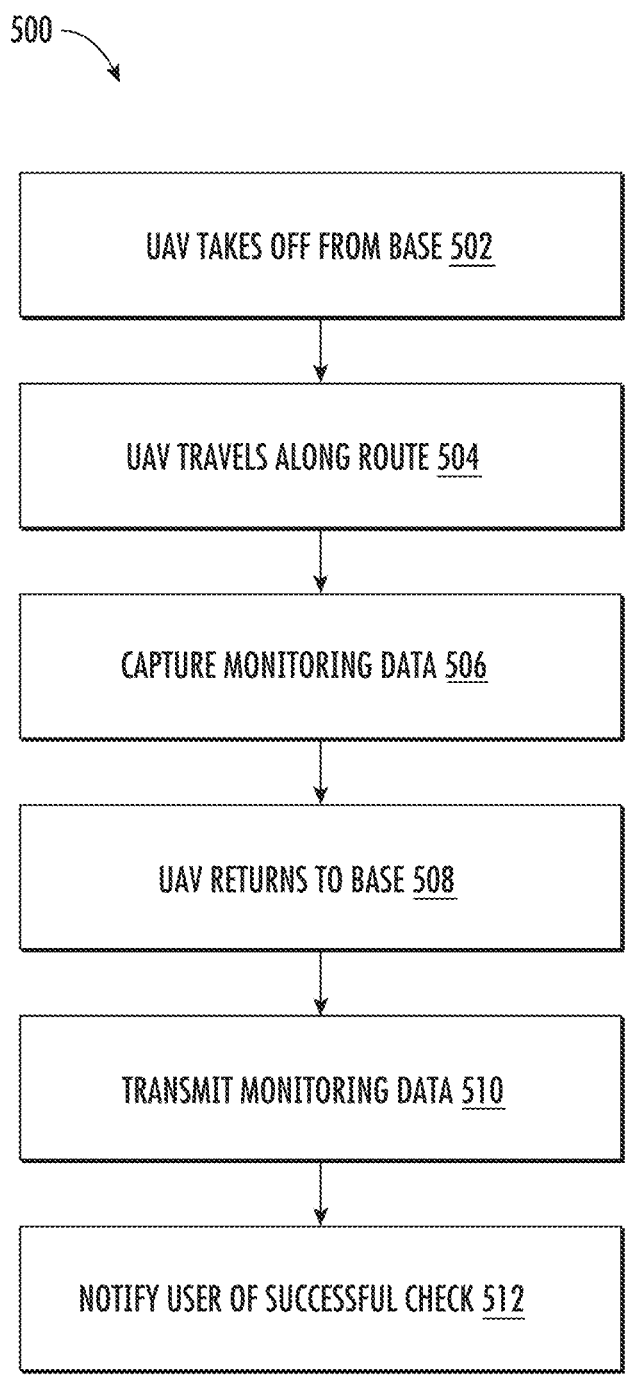
FIG. 5 is a flow diagram of a method for performing an opening or closing procedure at a provider location where no foreign object or threat is detected, according to an example embodiment.

Referring to FIG. 5, a flow diagram of method 500 of a building inspection associated with an opening procedure or a closing procedure is shown. The method 500 may be conducted by the autonomous security system 100 (e.g., the building security system 102, the UAV security system 104, the security computing system 106, and the user device 108). Through the method 500, the security computing system 106 receives various monitoring data collected by building security system 102 and the UAV security system 104 and notifies a user (e.g., a provider location opening or closing manager) of a successful building inspection associated with the opening or closing procedure.

The method 500 begins by the UAV 190 leaving the UAV base 302 shown in FIG. 3, at step 502. In some instances, the UAV 190 may be manually commanded to leave the UAV base 302 by a user (e.g., a provider location opening or closing manager) via a corresponding device or system (e.g., the user device 108) upon initiation of the opening and/or closing procedure. In some other instances, the UAV security system 104 may be configured to command the UAV 190 to leave the UAV base 302 at a predetermined time. The predetermined time may be selected by a user via a corresponding client application (e.g., the building client application 118, the UAV client application 150, the security client application 168, the user client application 134) of a corresponding device or system (e.g., the building security system 102, the UAV security system 104, the security computing system 106, the user device 108). In some instances, the user may set a plurality of predetermined times for the UAV 190 to leave the UAV base 302 (e.g., to perform a plurality of building inspections). For example, in some instances, the user may set the predetermined times to the corresponding times when the UAV 190 is to be used to conduct the opening procedure and the closing procedure.

After taking off from the base, at step 502, the UAV security system 104 is then configured to automatically guide the UAV 190 along a route around the provider location, at step 504. In some embodiments, the route may be set by a user via the corresponding client application of a corresponding system or device. In other embodiments, route is automatically established by the UAV security system 104 and the security computing system 106. For example, a user of the UAV security system 104 or the security computing system 106 may manually guide the UAV 190 (e.g., via the UAV client application 150 or the security client application 168) to perform an initial scan of the provider location and its surroundings. Once the initial scan has been performed, the security computing system 106 may then automatically determine an effective route for the UAV 190 to follow. In some embodiments, the route determined by the security computing system 106 may be modified or updated by various users. For example, various users may identify various locations around the provider location that are particularly susceptible to security threats and/or functional, structural, or cosmetic defects. The security computing system 106 may then use the identified locations around the provider location to modify the route of the UAV 190 to ensure a complete and/or proper analysis of the provider location and the surrounding areas.

As the UAV 190 is guided along the route, at step 504, the UAV security system 104 is configured to continuously capture monitoring data associated with the provider location and its surroundings using the various sensors described herein, at step 506. For example, the UAV security system 104 is configured to continuously capture video, audio, UWB, RFID, IR, night vision, and/or a variety of other sensor-type data associated with the provider location and its surroundings. In some instances, as the UAV security system 104 continuously captures the monitoring data, the UAV security system 104 is configured to continuously transmit the monitoring data in real time to the security computing system 106 to be analyzed to detect any potential threats and/or defects at or near the provider location. In some other instances, as the UAV security system 104 continuously captures the monitoring data, the UAV security system 104 is configured to continuously transmit low frequency or low data requirement monitoring data (e.g., video and/or audio feeds) to the security computing system 106 to be analyzed in real time to detect any potential threats and/or defects at or near the provider location and to retrievably store (e.g., within a database of the memory 146) high frequency or high data requirement monitoring data (e.g., three-dimensional visualization data or any sensor data used to create three-dimensional renderings of the interior and/or exterior of the provider location). In some other instances, as the UAV security system 104 continuously captures the monitoring data, the UAV security system 104 is alternatively configured to retrievably store all of the monitoring data (e.g., within a database of the memory 146) to be sent to the security computing system 106 upon return to the base.

After completing the route, the UAV returns to the base, at step 508. Once the UAV 190 has returned to the base, at step 508, if the UAV security system 104 has not already transmitted the monitoring data in real time to the security computing system 106, the UAV security system 104 then transmits the stored monitoring data collected along the route to the security computing system 106 for analysis, at step 510. The monitoring data may be used by the security computing system 106 to identify any potential threats or defects as described herein.

Once the monitoring data has been transmitted to and analyzed by the security computing system 106, a user (e.g., a provider location opening manager or closing manager) may be notified of a successful building inspection, at step 512. This notification may be provided to the user as a push notification through a corresponding client application (e.g., the user client application 134), as an e-mail or text message delivered to the user's personal mobile device, or via any other suitable delivery method.

Figure 6:
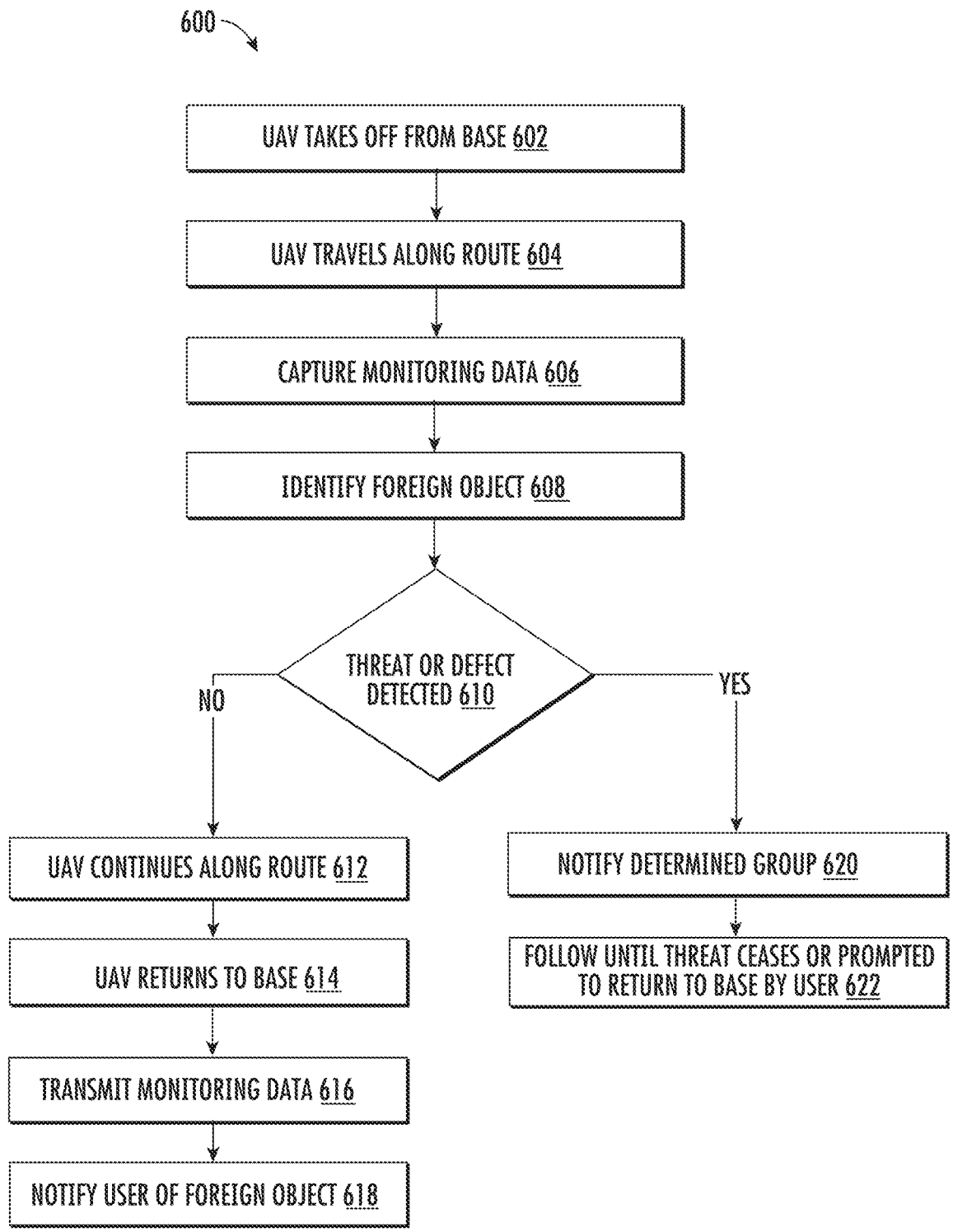
FIG. 6 is a flow diagram of a method for performing an opening or closing procedure at a provider location where a foreign object is detected, according to an example embodiment.

Referring to FIG. 6, a flow diagram of method 600 of a building inspection associated with an opening or closing procedure where a foreign object is detected is shown. The method 600 may similarly be conducted by the autonomous security system 100 (e.g., the building security system 102, the UAV security system 104, the security computing system 106, and the user device 108). Through the method 600, the security computing system 106 receives various monitoring data collected by building security system 102 and the UAV security system 104 and provides a notification to a user (e.g., a provider location opening or closing manager) and, in some embodiments, local authorities regarding the detected foreign object.

The method 600 begins when the UAV 190 leaves the UAV base 302, at step 602, is guided along the route, at step 604, and captures monitoring data associated with the provider location and its surroundings, at step 606, in a similar manner to steps 502, 504, and 506, respectively, as described with respect to FIG. 5. As discussed above, with respect to step 506, in some instances, at least portions of the monitoring data may be continuously transmitted or streamed to the security computing system 106 to be analyzed to detect any potential threats and/or defects at or near the provider location. Alternatively or additionally, the UAV security system 104 may be configured to independently analyze the monitoring data to detect any potential threats and/or defects at or near the provider location.

Accordingly, as the UAV 190 captures the monitoring data, at step 606, the UAV security system 104 and/or the security computing system 106 may identify a foreign object, at step 608. A foreign object may be an object that is not recognized or otherwise expected by the UAV security system 104 and/or the security computing system 106. For example, a foreign object may comprise a downed tree branch, a vehicle, a person on the premises of the provider location, an unidentified package, or any other object that is not recognized or otherwise expected. In some embodiments, various common objects (e.g., garbage and recycling containers, ATMs) may be recognized or otherwise expected by the UAV security system 104 and/or the security computing system 106, and may thus not be flagged as foreign objects by the UAV security system 104 and/or the security computing system 106.

After the foreign object is identified, at step 608, the UAV security system 104 and/or the security computing system 106 determines whether the foreign object poses a threat or has caused a structural, functional, and/or cosmetic defect at the provider location, at step 610. The UAV security system 104 and/or the security computing system 106 may be configured to detect whether a threat or defect is present at the provider location using any of the various components, capabilities, and/or other methods described herein.

In one illustrative embodiment, the UAV security system 104 and/or the security computing system 106 may identify a package outside of the provider location using the monitoring data collected by the UAV security system 104. In this case, the UAV security system 104 and/or the security computing system 106 may use UWB sensor data captured by the UAV security system 104 to analyze the contents within the package to determine whether the package contains an item that constitutes a threat (e.g., a bomb).

In another illustrative embodiment, the UAV security system 104 and/or the security computing system 106 may identify a person outside of the provider location using the monitoring data collected by the UAV security system 104. In this case, the UAV security system 104 and/or the security computing system 106 (e.g., the threat analysis AI circuit 174) may use one or more emotional AI models to determine whether the person is aggravated and/or use the UWB sensor data captured by the UAV security system 104 to determine whether the person is carrying a weapon to ultimately determine whether the person constitutes a threat.

In yet another illustrative embodiment, the UAV security system 104 and/or the security computing system 106 may identify a fallen branch laying on a gas line within the monitoring data collected by the UAV security system 104. In this case, the UAV security system 104 and/or the security computing system 106 may use UWB and/or IR sensor data captured by the UAV security system 104 to determine whether hot and/or low-density gas is leaking from the gas line to determine whether the detected foreign object has caused a structural, functional, and/or cosmetic defect at the provider location, as well as to determine a confidence level and/or a severity level of the defect.

Accordingly, the UAV security system 104 and/or the security computing system 106 may make a variety of determinations based on the monitoring data captured by the UAV security system 104 and, based on those determinations, determine whether the detected foreign object constitutes a threat and/or defect. The UAV security system 104 and/or the security computing system 106 may further be configured to determine a confidence level and/or a severity level associated with the detected threat and/or defect. In some instances, the UAV security system 104 and/or security computing system 106 (e.g., the notification circuit 184) may be configured to instantly generate and transmit an alert to various appropriate parties depending on the confidence level and/or the severity level associated with a detected threat and/or defect (e.g., the foreign object), as described above.

If the foreign object is not determined to constitute a threat or a defect, at step 610, the UAV security system 104 is configured to resume the building inspection by guiding the UAV 190 along the remaining portion of the route, at step 612, and return to the base, at step 614. Once the UAV 190 has returned to the base, at step 614, any remaining stored monitoring data (e.g., high frequency or high data requirement monitoring data) collected along the route may be transmitted to the security computing system 106 for a full analysis, at step 616.

After the monitoring data has been transmitted to the security computing system 106, at step 616, a user (e.g., an opening or closing manager) may be notified of a successful building inspection associated with the opening procedure or the closing procedure, at step 618. For example, the notification circuit 184 of the security computing system 106 may be configured to generate the notification based on the monitoring data and the detected foreign object. In some instances, the notification may include a picture or video of the foreign object to be viewed by the user via a client application (e.g., user client application 134), an email, a text message, or any other suitable notification method. In some embodiments, the image or video of the object may be a heat map style image (e.g., a thermographic image) that can be viewed alone or as an overlay to the image or video from a camera, as discussed above. In some embodiments, the user may decide to not receive notifications of certain foreign objects (e.g., vehicles if the building shares a common parking lot). For example, the user may register various objects as known or expected objects, such that the UAV security system 104 and/or the security computing system 106 will avoid flagging those objects as foreign during future building inspections.

If the foreign object is determined to be a threat and/or to have caused a structural, functional, and/or cosmetic defect, at step 610, a user or group of users or relevant parties may be notified, at step 620. In some instances, depending on the confidence level and severity level of the detected threat and/or defect, the notification circuit 184 is configured to identify an appropriate set of relevant parties to alert, as discussed above. For example, in one illustrative embodiment, a person may be identified as being disgruntled and carrying a weapon. Accordingly, this detected person may be determined to be a threat having a high severity level. In this instance, the notification circuit 184 may be configured to notify the local police department as well as various employees associated with the provider location. Additionally, in some instances, upon detecting a threat or a defect at the provider location, the UAV security system 104 may be configured to control the UAV 190 to follow and/or continue monitoring the threat or defect, at step 622. The UAV security system 104 may be configured to control the UAV 190 to follow and/or continue monitoring the threat or defect until the threat has ceased, the defect has been addressed, or the UAV 190 is prompted by a user (e.g., via the user device 108) to continue along the route.

Once the threat has ceased, the defect has been addressed, or the UAV 190 has been prompted by a user to continue along the route, the UAV security system 104 is configured to resume the building inspection by guiding the UAV 190 along the remaining portion of the route, at step 612, returning the UAV 190 to UAV base 302, at step 614, and transmitting any remaining stored monitoring data to the security computing system 106, at step 616. In some instances, the notification circuit 184 may then provide an additional notification to a user (e.g., an opening or closing manager) indicating the building inspection has been completed, at step 618. In some instances, the additional notification may indicate that no further threats and/or defects were detected. In some other instances, the additional notification may include an alert that an additional threat and/or defect was detected within the monitoring data. For example, in one embodiment, the building inspection circuit 178 may determine, based on the monitoring data that a gas leak has occurred. Accordingly, the notification circuit 184 may be configured to automatically notify the local fire department and the opening staff regarding the detected gas leak.

Figure 7:
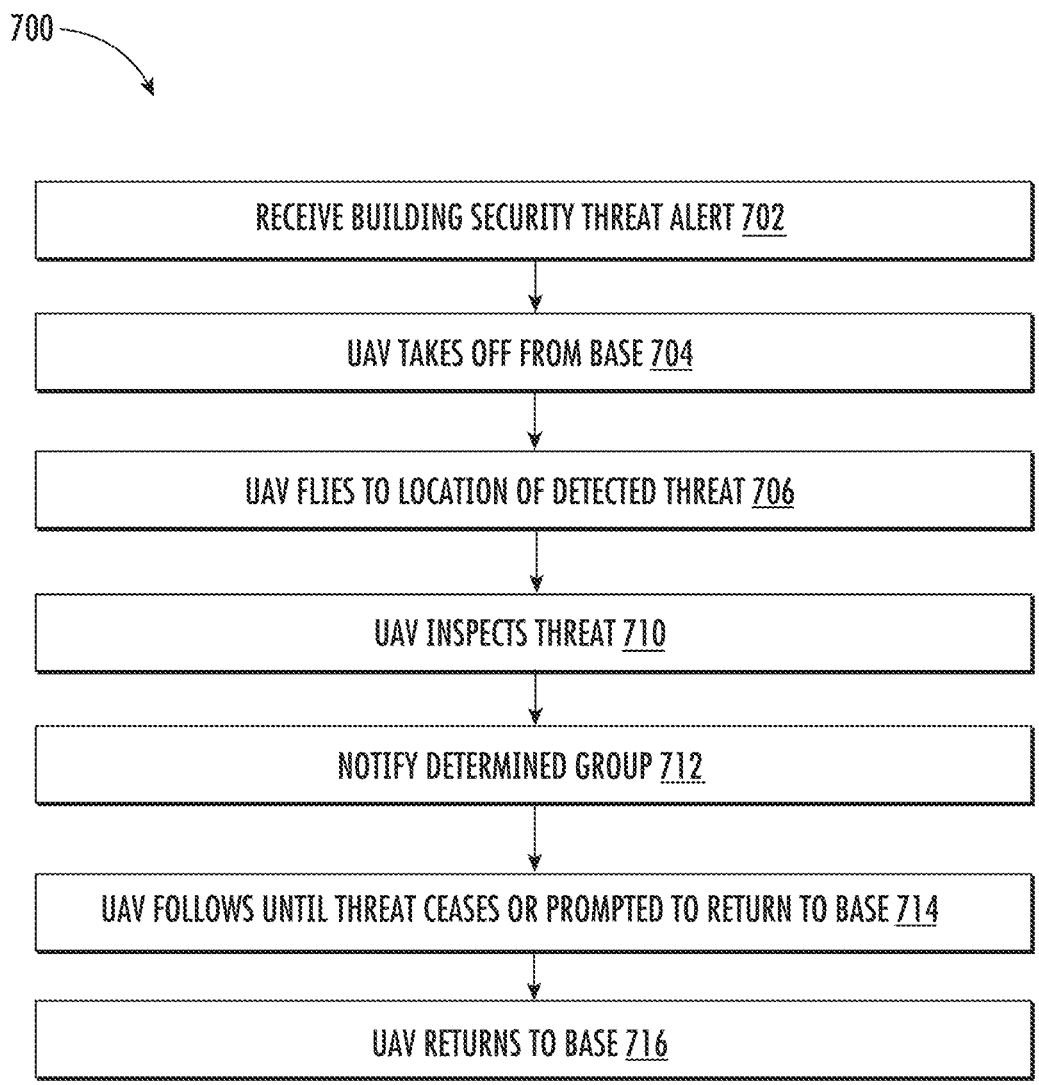
FIG. 7 is a flow diagram of a method for prompting an UAV to take off and inspect a particular threat based on a threat determined by the building security system, according to an example embodiment.

Referring to FIG. 7, a flow diagram of method 700 of prompting the UAV 190 to take off in response to a building security threat alert, to inspect a particular threat based on the building security threat alert, and follow/monitor the threat until the threat ceases or the UAV 190 return to base or has been commanded to return to base. The method 700 shows how, in addition to the recurring building inspections associated with the opening and closing procedures discussed above, the UAV 190 can be deployed and used in response to various alerts to allow for immediate remote assessment of a potential threat at or near the provider location throughout the day. The method 700 may similarly be performed by the autonomous security system 100 (e.g., the building security system 102, the UAV security system 104, the security computing system 106, and the user device 108). The method 700 may be utilized to assess threats both inside and outside of the provider location.

Method 700 begins when a building security threat alert is received by the UAV security system 104, at step 702. In some instances, the building security threat alert may be sent by the building security system 102 in response to a manual detection of a potential threat (e.g., a person seeing or reporting a potential threat at or near the provider location). In some other instances, the building security threat alert can be generated and sent to the UAV security system 104 by the building security system 102 and/or the security computing system 106. For example, the building security system 102 and/or the security computing system 106 may be configured to detect potential threats at or near the provider location based on various sensor data captured by the building security system 102. For example, the building security system 102 and/or the security computing system 106 may be configured to analyze monitoring data obtained by the building security system 102 (e.g., video, audio, and other sensor data) to detect the potential threats.

In some embodiments, the building security system 102 and/or the security computing system 106 may detect a threat and have enough information, based on the monitoring data obtained by the building security system 102, to assign the threat a high confidence level. Accordingly, based on the severity of the threat, the notification circuit 184 may be configured to automatically generate and provide alerts to various appropriate parties. In some other embodiments, the building security system 102 and/or the security system 106 may detect a threat, but may determine that, based on the monitoring data obtained by the building security system 102, that the threat should be identified as a low confidence level threat.

In either case (e.g., regardless of the confidence level of the detected threat), the building security system 102 and/or the security computing system 106 may be configured to command the UAV security system 104 to gather additional/differing monitoring data pertaining to the detected threat to aid in assessing and/or monitoring the detected threat. For example, to gather the additional/differing monitoring data, the UAV security system 104 may first command the UAV 190 to take off from the base, at step 704, and then guide the UAV 190 to the location of the detected threat, at step 706. In some embodiments, the location of the detected threat may be determined by the building security system 102 and/or the security computing system 106 based on the location of a particular sensor of the building security system 102 that detected the threat. In some embodiments, the location of the detected threat may be indicated by a user via a corresponding client application (e.g., the user client application 134). As noted above, the UAV security system 104 may utilize the GPS, monitoring, and/or RFID sensor data to determine the location, flight direction, and speed of the UAV 190, allowing the UAV security system 104 to accurately and safely guide the UAV 190 to the location where the threat was determined, if outside the building. In other embodiments, the user may be able to take temporary manual control of the UAV 190 via a corresponding client application (e.g., the user client application 134).

After the UAV 190 arrives at the determined location, the UAV security system 104 is configured to inspect the detected threat using the UAV 190, at step 710. In some embodiments, the UAV 190 is used to determine if the detected threat is, in fact, a threat. In other embodiments, the UAV 190 is used to monitor the threat and provide additional insight. For example, in some instances, if the threat is assigned a low confidence level, the building security system 102 and/or the security computing system 106 may determine that additional insight (e.g., UWB sensor data, night vision data, infrared sensor data, or any of other data collected by the various sensors discussed above) provided by the UAV security system 104 is necessary to properly assess the threat. In some instances, even if the threat is assigned a high confidence level, the building security system 102 and/or the security computing system 106 may determine that additional insight provided by the UAV security system 104 may be necessary to adequately monitor the threat until the threat has ceased.

For example, in one illustrative embodiment, the building security system 102 and/or the security computing system 106 may be able to identify movement outside of the provider location at night, but may be unable to determine the source of the movement (e.g., whether the movement may be a threat). This may prompt the building security system 102 and/or the security computing system 106 to command the UAV security system 104 to deploy the UAV 190 to the location of the potential threat. The UAV security system 104 may then utilize night vision or other sensors to accurately identify the object and determine if it constitutes a threat.

In another illustrative embodiment, in the event of a fire at the provider location, a fire alarm may be pulled and the local fire department may be notified. In this instance, the building security system 102 and/or the security computing system 106 may command the UAV security system 104 to deploy the UAV 190 to assist the local fire department to determine whether and/or where any remaining employees are left within the provider location. For example, the monitoring data (e.g., various video, audio, and other sensors data) may be provided to a user (e.g., a security employee, a fire fighter) via a mixed reality (MR) or AR wearable device or other user device that may allow for the user to see a real-time image of the provider location with an overlay indicating where an employee or several employees remain within the provider location. Accordingly, the UAV security system 104 may utilize the UAV 190 to monitor the provider location until all of the provider employees are safely retrieved from the provider location.

In a further illustrative embodiment, the building security system 102 and/or the security computing system 106 may identify a person loitering outside the building, but may be unable to determine whether the person is a threat. In this instances, the building security system 102 and/or the security computing system 106 may command the UAV security system 104 to deploy the UAV 190 to capture additional monitoring data pertaining to the person loitering to aid in assessing whether or not the person loitering is a threat. For example, the monitoring data captured by the UAV 190 may add additional insight in the form of alternative views of the person, as well as the ability to determine if the person is carrying a weapon.

If the detected threat is confirmed, the security computing system 106 may notify a user or group of users or relevant parties, at step 712, which may be performed similarly or identically to step 620 discussed above, with respect to FIG. 6. Furthermore, once the appropriate parties have been notified, the UAV security system 104 may be configured to control the UAV 190 to follow and/or continue monitoring the threat, at step 714, until the threat has ceased or the UAV 190 is prompted by the user (e.g., via the user device 108) to return to base. Once the threat has ceased or the UAV 190 has been prompted by the user to return to base, the UAV security system 104 is configured to guide the UAV 190 back to base, at step 716.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring, and so on.

The "circuit" may also include one or more dedicated processors communicatively coupled to one or more dedicated memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Additionally, or alternatively, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor), microprocessor, etc.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. An autonomous security system associated with a provider location, the autonomous security system comprising:
    an unmanned aerial vehicle (UAV);
    a user device; and
    a UAV security system comprising a network interface and a processing circuit, the network interface structured to facilitate data communication with the UAV and the user device via a network, the processing circuit comprising a processor and a memory, the processing circuit structured to:
        deploy the UAV from a UAV base;
        guide the UAV along a predetermined route within or near the provider location;
        receive monitoring data associated with the provider location and its surroundings from the UAV, the monitoring data comprising ultra-wideband (UWB) data and radio-frequency identification (RFID) data, the RFID data being associated with a sensed location of an RFID chip coupled with a structural component of the provider location;
        identify a foreign object based on the monitoring data;
        determine that the foreign object is one of a security threat or a defect; and
        provide a notification to the user device regarding the one of the security threat or the defect.

2. The autonomous security system of claim 1, wherein the RFID chip is individually identifiable and associated with a predetermined location within an expected layout of the provider location, and wherein the processing circuit is further structured to generate a real-time rendering of the provider location and its surroundings using the monitoring data by orienting the sensed location of the RFID chip with the predetermined location within the expected layout of the provider location.

3. The autonomous security system of claim 1, wherein determining that the foreign object is one of the security threat or the defect comprises determining that the foreign object is the security threat using a threat analysis artificial intelligence (AI) circuit to determine that the foreign object is the security threat, the threat analysis AI circuit utilizing AI models trained using at least one of inputs received from a user over time, historical data, or pre-gathered threat detection data.

4. The autonomous security system of claim 3, wherein the threat analysis AI circuit utilizes at least one of an object detection model or an emotional recognition model.

5. The autonomous security system of claim 4, wherein the threat analysis AI circuit utilizes the object detection model in conjunction with the UWB data to identify a concealed object.

6. A method for performing an opening or closing security procedure at a provider location using an unmanned aerial vehicle (UAV), the method comprising:
    deploying, by an autonomous security system, the UAV from a UAV base;
    guiding, by the autonomous security system, the UAV along a predetermined route within or near the provider location;
    receiving, by the autonomous security system, monitoring data associated with the provider location and its surroundings from the UAV, the monitoring data comprising ultra-wideband (UWB) data and radio-frequency identification (RFID) data, the RFID data being associated with a sensed location of an RFID chip coupled with a structural component of the provider location;
    identifying, by the autonomous security system, a foreign object within the provider location and its surroundings based on the monitoring data;
    determining, by the autonomous security system, that the foreign object is one of a security threat or a defect; and
    providing, by the autonomous security system, a notification to a user device regarding the one of the security threat or the defect.

7. The method of claim 6, wherein the RFID chip is individually identifiable and associated with a predetermined location within an expected layout of the provider location, and further comprising generating a real-time rendering of the provider location and its surroundings using the monitoring data by orienting the sensed location of the RFID chip with the predetermined location within the expected layout of the provider location.

8. The method of claim 6, wherein determining that the foreign object is one of the security threat or the defect comprises determining that the foreign object is the security threat.

9. The method of claim 8, wherein determining that the foreign object is the security threat comprises using a threat analysis artificial intelligence (AI) circuit to determine that the foreign object is the security threat, the threat analysis AI circuit utilizing AI models trained using at least one of inputs received from a user over time, historical data, or pre-gathered threat detection data.

10. The method of claim 9, wherein the threat analysis AI circuit utilizes at least one of an object detection model or an emotional recognition model.

11. The method of claim 10, wherein the threat analysis AI circuit utilizes the object detection model in conjunction with the UWB data to identify a concealed object.

12. The method of claim 6, wherein determining that the foreign object is one of the security threat or the defect comprises determining that the foreign object is the defect.

13. The method of claim 12, wherein the defect is at least one of a structural defect, a functional defect, or a cosmetic defect associated with the provider location.

14. The method of claim 6, wherein guiding the UAV along the predetermined route within or near the provider location is performed automatically by a spatial recognition circuit configured to utilize the monitoring data to continuously determine at least one of a location, a flight direction, or a speed of the UAV.

15. The method of claim 6, wherein the monitoring data further includes at least one of video data, audio data, infrared data, or night vision data.

16. A method for assessing a potential threat at a provider location using an unmanned aerial vehicle (UAV), the method comprising:
    detecting, by an autonomous security system, the potential threat within or near the provider location;
    deploying, by the autonomous security system, the UAV from a UAV base in response to detecting the potential threat;
    guiding, by the autonomous security system, the UAV to a location of the potential threat;
    receiving, by the autonomous security system, monitoring data associated with the provider location and the potential threat from the UAV, the monitoring data comprising ultra-wideband (UWB) data and radio-frequency identification (RFID) data, the RFID data being associated with a sensed location of an RFID chip coupled with a structural component of the provider location;

determining, by the autonomous security system, that the potential threat is a security threat based on the monitoring data; and providing, by the autonomous security system, a notification to a user device regarding the security threat.

17. The method of claim 16, wherein the RFID chip is individually identifiable and associated with a predetermined location within an expected layout of the provider location, and further comprising generating a real-time rendering of the provider location and its surroundings using the monitoring data further by orienting the sensed location of the RFID chip with the predetermined location within the expected layout of the provider location.

18. The method of claim 16, wherein the monitoring data further includes at least one of video data, audio data, infrared data, or night vision data.

19. The method of claim 16, wherein determining that the potential threat is the security threat comprises using a threat analysis artificial intelligence (AI) circuit to determine that the potential threat is the security threat, the threat analysis AI circuit utilizing AI models trained using at least one of inputs received from a user over time, historical data, or pre-gathered threat detection data.

20. The method of claim 19, wherein the threat analysis AI circuit utilizes at least one of an object detection model or an emotional recognition model.

\* \* \* \* \*